United States Patent
Jeong et al.

(10) Patent No.: US 12,028,954 B2
(45) Date of Patent: Jul. 2, 2024

(54) INDUCTION HEATING APPARATUS AND METHOD FOR CONTROLLING SAME

(71) Applicants: LG ELECTRONICS INC., Seoul (KR); UNIST (ULSAN NATIONAL INSTITUTE OF SCIENCE AND TECHNOLOGY), Ulsan (KR)

(72) Inventors: Sihoon Jeong, Seoul (KR); Kyelyong Kang, Seoul (KR); Jinwook Han, Seoul (KR); Hwa Pyeong Park, Ulsan (KR); Jee Hoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 17/313,354

(22) Filed: May 6, 2021

(65) Prior Publication Data

US 2021/0352772 A1    Nov. 11, 2021

(30) Foreign Application Priority Data

May 6, 2020  (KR) .......................... 10-2020-0054012

(51) Int. Cl.
*H05B 6/06* (2006.01)
*H02M 7/5387* (2007.01)
(Continued)

(52) U.S. Cl.
CPC ........ *H05B 6/062* (2013.01); *H02M 7/53871* (2013.01); *H05B 6/12* (2013.01); *H02M 5/4585* (2013.01); *H05B 2213/05* (2013.01)

(58) Field of Classification Search
CPC .. H02M 7/53871; H02M 5/4585; H05B 6/12; H05B 6/062; H05B 2213/05
See application file for complete search history.

(56) References Cited

U.S. PATENT DOCUMENTS

2011/0192838 A1    8/2011  Fujita et al.
2015/0245416 A1    8/2015  Yoshino et al.
(Continued)

FOREIGN PATENT DOCUMENTS

EP    2 334 142 A1    6/2011
EP    2 170 010 B1    3/2015
(Continued)

OTHER PUBLICATIONS

Park, Hwa-Pyeong et al: "Load Adaptive Modulation of a Series-Resonant Inverter for All-Metal Induction Heating Applications", IEEE Transactions on Industrial Electronics, IEEE Service Center, Piscataway, NJ, USA, vol. 65, No. 9, Sep. 1, 2018 (Sep. 1, 2018), pp. 6983-6993, XP011682647.
(Continued)

*Primary Examiner* — Dana Ross
*Assistant Examiner* — Kuangyue Chen
(74) *Attorney, Agent, or Firm* — KED & ASSOCIATES, LLP

(57) ABSTRACT

An induction heating apparatus according to one embodiment may confirm a feature of a container and determine an operation mode based on the feature of the container before performing an operation of heating the container. In one embodiment, the operation mode of the induction heating apparatus may be determined as any one of a frequency doubler mode, a half bridge mode, and a full bridge mode. In one embodiment, a power control mode of the induction heating apparatus may be determined based on an operation mode of the induction heating apparatus. In one embodiment, the power control mode of the induction heating apparatus may be determined as any one of an asymmetric pulse width modulation (APWM) mode and a phase shift mode.

7 Claims, 19 Drawing Sheets

(51) Int. Cl.
*H05B 6/12* (2006.01)
*H02M 5/458* (2006.01)

(56) References Cited

U.S. PATENT DOCUMENTS

| | | |
|---|---|---|
| 2018/0177000 A1 | 6/2018 | Son et al. |
| 2020/0323044 A1 | 10/2020 | Kang et al. |
| 2021/0127463 A1 | 4/2021 | Son et al. |

FOREIGN PATENT DOCUMENTS

| | | | |
|---|---|---|---|
| EP | 3337294 | 6/2018 | |
| EP | 3697174 | 8/2020 | |
| GB | 2520887 | 6/2015 | |
| JP | 2006-134689 | 5/2006 | |
| JP | 2009-099324 | 5/2009 | |
| KR | 10-2018-0002247 | 1/2018 | |
| KR | 10-2019-0040843 A | 4/2019 | |
| WO | WO-2019074246 A1 * | 4/2019 | ............... H05B 6/04 |
| WO | WO 2021/045402 | 3/2021 | |

OTHER PUBLICATIONS

European Search Report dated Sep. 29, 2021 issued in Application No. 21172568.4.
International Search Report dated Aug. 26, 2021 issued in Application No. PCT/KR2021/005649.

* cited by examiner

INDUCTION HEATING APPARATUS AND METHOD FOR CONTROLLING SAME

CROSS-REFERENCE TO RELATED APPLICATION

This application claims priority to and the benefit of Korean Patent Application No. 10-2020-0054012, filed on May 6, 2020, the disclosure of which is incorporated herein by reference in its entirety.

BACKGROUND

1. Field

Disclosed herein are an induction heating apparatus and a method of controlling the same.

2. Background

Induction heating apparatuses are devices that generate eddy current in a metallic container and heat the container using a magnetic field generating around a working coil. When the induction heating apparatus is driven, high-frequency current is supplied to the working coil. Accordingly, an induction magnetic field is generated around the working coil disposed in the induction heating apparatus. When magnetic line of force of the induction magnetic field passes through a bottom of the metallic container over the working coil, eddy current is generated inside the bottom of the container. When the eddy current flows in the container, and the container itself is heated.

FIG. 1 is a view schematically showing a configuration of a circuit of an induction heating apparatus of the related art. FIG. 2 is a graph showing a curve of a resonance characteristic of a working coil of the induction heating apparatus in FIG. 1.

Referring to FIG. 1, the induction heating apparatus 3 of the related art includes a rectifier circuit 32, a smoothing circuit L1, C1, and inverter circuit 34, and a working coil 36.

The rectifier circuit 32 includes a plurality of diode elements D1, D2, D3, D4. The rectifier circuit 32 rectifies AC input voltage supplied from a power supply device 30 and outputs voltage having pulse waveforms.

The smoothing circuit L1, C1 smooths the voltage rectified by the rectifier circuit 32 and outputs DC link voltage. The smoothing circuit L1, C1 includes an inductor L1 and a DC link capacitor C1.

The inverter circuit 34 includes a first switching element SW1, a second switching element SW2, a first capacitor C2, and a second capacitor C3. The first switching element SW1 and the second switching element SW2 are complementarily turned on and turned off respectively by a first switching signal S1 and a second switching signal S2. As a result of complementary turn-on and turn-off operations of the first switching element SW1 and the second switching element SW2, the DC link voltage output from the smoothing circuit L1, C1 is converted into AC voltage for driving the working coil 132.

When the inverter circuit 34 supplies AC voltage (or AC current) to the working coil 36, resonance of the working coil 36 occurs. FIG. 2 shows a curve of a resonance characteristic that indicates a change in output power values depending on a driving frequency of the working coil 36.

As illustrated in FIG. 2, the output power value of the working coil 36 gradually decreases with respect to a resonance point, i.e., resonance current fr. The curve of a resonance characteristic of FIG. 2 shows that in an area of a frequency lower than the resonance frequency fr, hard switching of the switching elements included in the inverter circuit 34 occurs. Accordingly, power conversion efficiency is low. Thus, the driving frequency of the working coil 36 is set to a frequency greater than the resonance frequency fr.

When a user sets a power level of a heating zone of the induction heating apparatus in a state in which a container is in the heating zone, a required power value and a driving frequency of a working coil 36 disposed at a position corresponding to the heating zone is set. In an example, when the power level of the heating zone is set to 8, the required power value of the working coil 36 is set to P1, and the driving frequency of the working coil 36 is set to f1. In another example, when the power level of the heating zone is set to 2, the required power value of the working coil 36 is set to 500 W, and the driving frequency of the working coil 36 is set to 60 kHz. That is, as the power level of the heating zone is set to a higher value, the required power value of the working coil 36 is set to a higher value while the driving frequency of the working coil is set to a lower value.

The resonance frequency fr and resonance characteristic of the working coil 36 change depending on characteristics such as material, magnetic permeability and resistivity of a container used for an induction heating apparatus. The induction heating apparatus of the related art is designed considering a resonance characteristic of a magnetic container ensuring excellent power conversion efficiency. Accordingly, when a container (e.g., a non-magnetic container) having low power conversion efficiency is heated by the induction heating apparatus of the related art, the working coil cannot output power sufficiently or the driving frequency of the working coil is set to an excessively high frequency. Thus, a temperature of the switching element included in the inverter circuit increases, and the switching element can be burned out. That is, the induction heating apparatus of the related art cannot heat various types of containers having different features.

Additionally, the induction heating apparatus of the related art, as illustrated in FIG. 2, adjusts the output power value of the working coil using a pulse frequency modulation (PFM) method by which a driving frequency of a working coil is changed. According to the pulse frequency modulation method, as the required power value of the working coil becomes lower, the driving frequency of the working coil is set to a higher value. However, as the driving frequency of the working coil is set to a higher value, power loss increases and the power conversion efficiency deteriorates due to fast switching operations of the switching element included in the inverter circuit. Thus, it is highly likely that the switching element generates heat and is burned out.

BRIEF DESCRIPTION OF THE DRAWINGS

The accompanying drawings constitute a part of the specification, illustrate one or more embodiments in the disclosure, and together with the specification, explain the disclosure, wherein.

DETAILED DESCRIPTION

Figure 1:
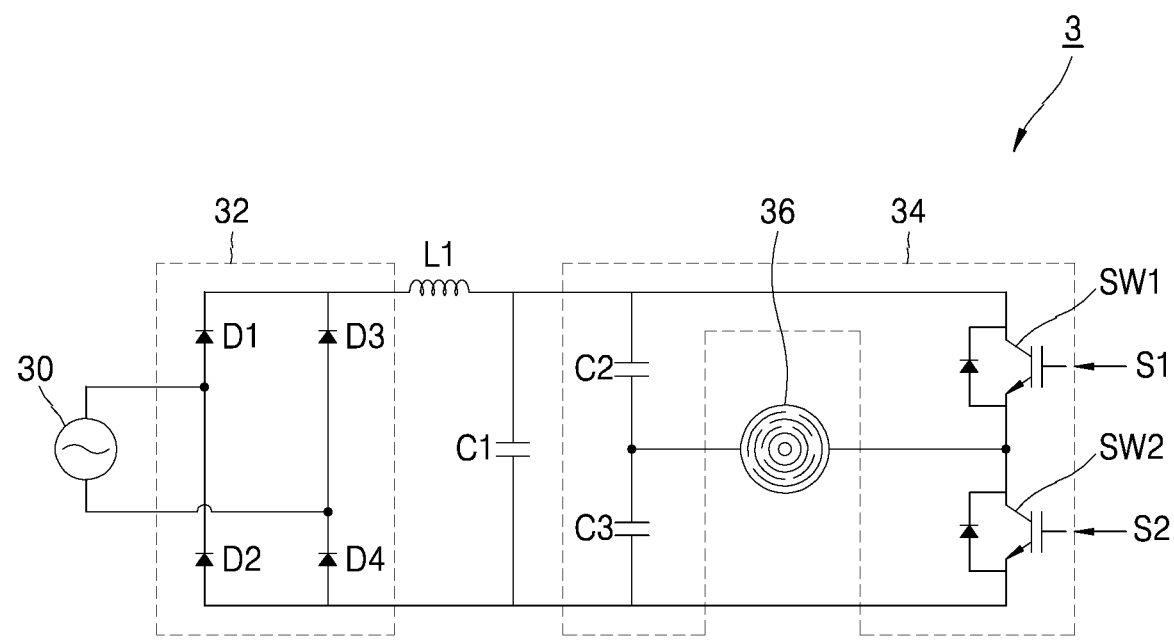
FIG. 1 is a view schematically showing a configuration of a circuit of an induction heating apparatus of the related art.
Figure 2:
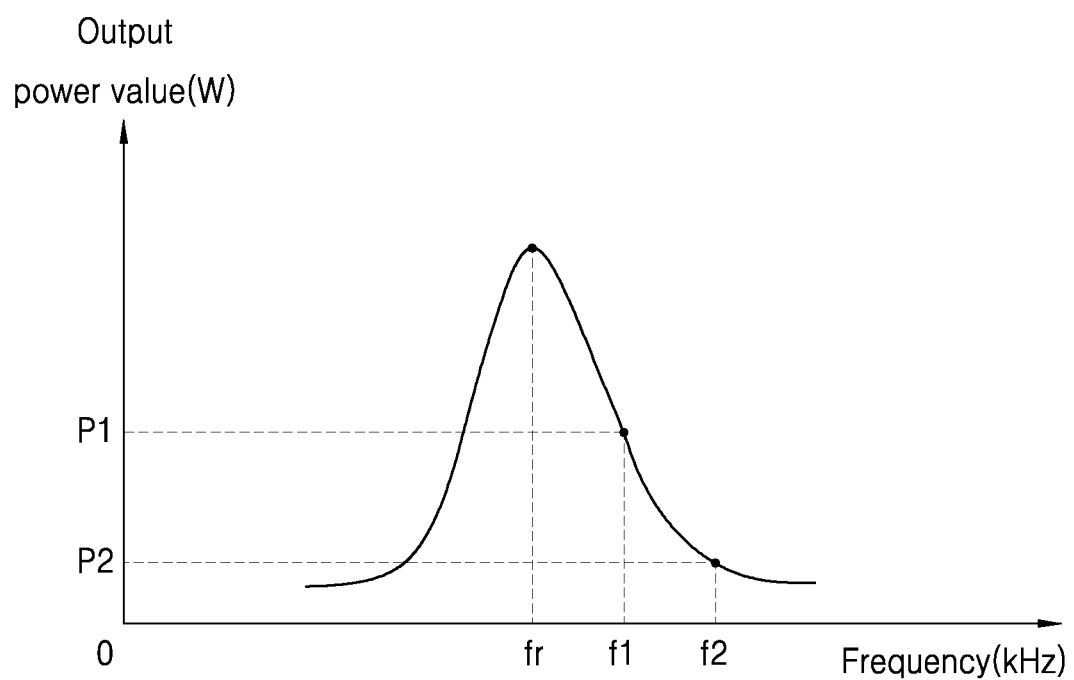
FIG. 2 is a graph showing a curve of a resonance characteristic of a working coil of the induction heating apparatus in FIG. 1.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

Figure 3:
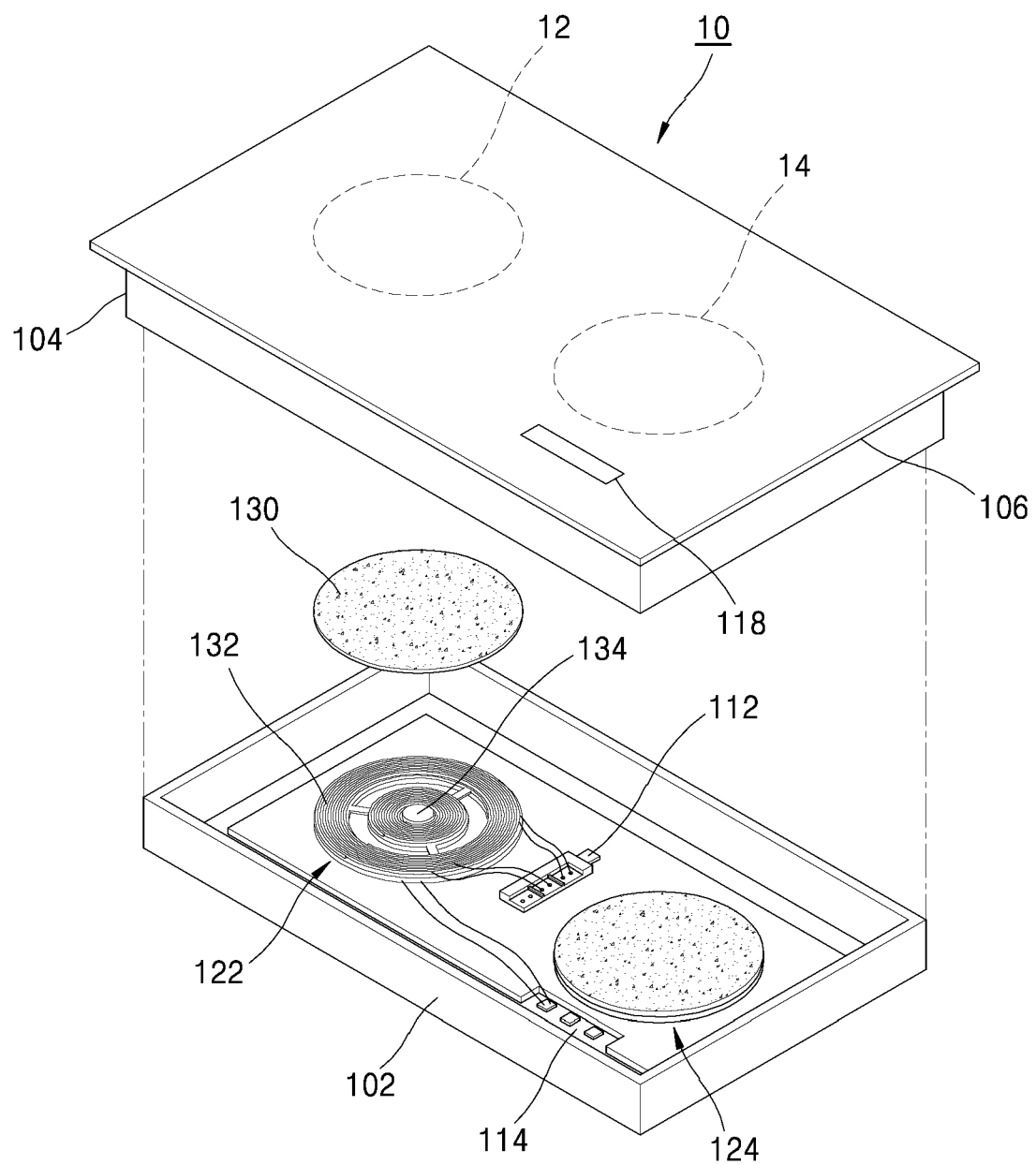
FIG. 3 is an exploded perspective view showing an induction heating apparatus according to one embodiment.

FIG. 3 is an exploded perspective view showing an induction heating apparatus according to one embodiment.

Referring to FIG. 3, the induction heating apparatus 10 according to one embodiment may include a case 102 constituting a main body, and a cover plate 104 coupled to the case 102 and configured to seal the case 102.

The cover plate 104 may be coupled to an upper surface of the case 102 and may seal a space, formed in the case 102, from the outside.

The cover plate 104 may include an upper plate 106 on which a container for cooking food is placed.

In one embodiment, the upper plate 106 may be made of tempered glass such as ceramic glass, but a material of the upper plate 106 may vary depending on embodiments.

Heating zones 12, 14 respectively corresponding to working coil assemblies 122, 124 may be formed on the upper plate 106. For a user to clearly recognize positions of the heating zones 12, 14, lines or figures corresponding to the heating zones 12, 14 may be printed or displayed on the upper plate 106.

The case 102 may have a hexahedron shape an upper portion of which is open. The working coil assemblies 122, 124 for heating a container may be arranged in the space formed in the case 102. Additionally, an interface 114 may be arranged in the case 102, may allow a user to set the supply power or to adjust a power level of each heating zone 12, 14, and/or may display information in relation to the induction heating apparatus 10.

The interface 114 may be implemented as a touch panel that makes it possible to input information and/or to display information as a result of a touch.

However, an interface 114 having a different structure may be used depending on embodiments. Also a combination of display with knobs or buttons might be applied as a user interface.

Additionally, the upper plate 106 may have a manipulation zone 118 at a position corresponding to a position of the interface 114. For a user's manipulation, letters or images and the like may be previously printed in the manipulation zone 118. The user may perform manipulation desired by the user by touching a specific point of the manipulation zone 118 with reference to the letters or images previously printed in the manipulation zone 118. Information output by the interface 114 may be displayed though the manipulation zone 118.

The user may set a power level of each heating zone 12, 14 through the interface 114. The power level may be displayed on the manipulation zone 118 as numbers (e.g., 1, 2, 3, . . . , 9). When a power level of each heating zone 12, 14 is set, a required power value and a driving frequency of a working coil corresponding to each heating zone 12, 14 may be determined. A controller (not illustrated here) may drive each working coil 132 of the working coil assemblies 122, 124 such that an output power value of each working coil 132 matches the required power value set by the user, based on the determined driving frequency.

Additionally, a power supply 112 for supplying power to the working coil assembly 122, 124 or the interface 114 may be disposed in the space formed in the case 102.

FIG. 3 shows two working coil assemblies, i.e., a first working coil assembly 122 and a second working coil assembly 124 arranged in the case 102 as an example. However, three or more working coil assemblies may be disposed in the case 102 depending on embodiments.

The working coil assembly 122, 124 may include a working coil 132 that forms an induction magnetic field using high-frequency alternating current supplied by the power supply 112, and a thermal insulation sheet 130 that protects a coil 132 from heat generated by a container. For example, the first working coil assembly 122 may include a first working coil 132 for heating a container placed in a first heating zone 12, and a first thermal insulation sheet 130 in FIG. 3. Though not illustrated in the drawing, the second working coil assembly 124 may include a second working coil and a second thermal insulation sheet. Depending on embodiments, the thermal insulation sheet may not be provided.

Additionally, a temperature sensor may be disposed in a central portion of each working coil 132. For example, a temperature sensor 134 may be in a central portion of the first working coil 134 in FIG. 3. The temperature sensor 134 may measure a temperature of a container in each heating zone 12, 14. In one embodiment, the temperature sensor 134 may be a thermistor temperature sensor having a variable resistance whose resistance value changes according to the temperature of the container, but is not limited thereto.

In one embodiment, the temperature sensor 134 may output sensing voltage corresponding to a temperature of a container, and the sensing voltage output from the temperature sensor 134 may be delivered to the controller. The controller may check the temperature of the container based on magnitude of the sensing voltage output from the temperature sensor 134, and when the temperature of the container is a predetermined reference value or greater, the controller may perform an overheat prevention function by lowering an output power value of a working coil 132 or by stopping driving of a working coil 132.

Though not illustrated in FIG. 3, a substrate, on which a plurality of circuits or a plurality of elements including the controller are mounted, may be disposed in the space formed in the case 102. The controller may perform a heating operation by driving each working coil 132 according to the user's heating initiation instruction input through the interface 114. When the user inputs a heating termination instruction through the interface 114, the controller may finish the heating operation by stopping the driving of the working coil 132.

Figure 4:
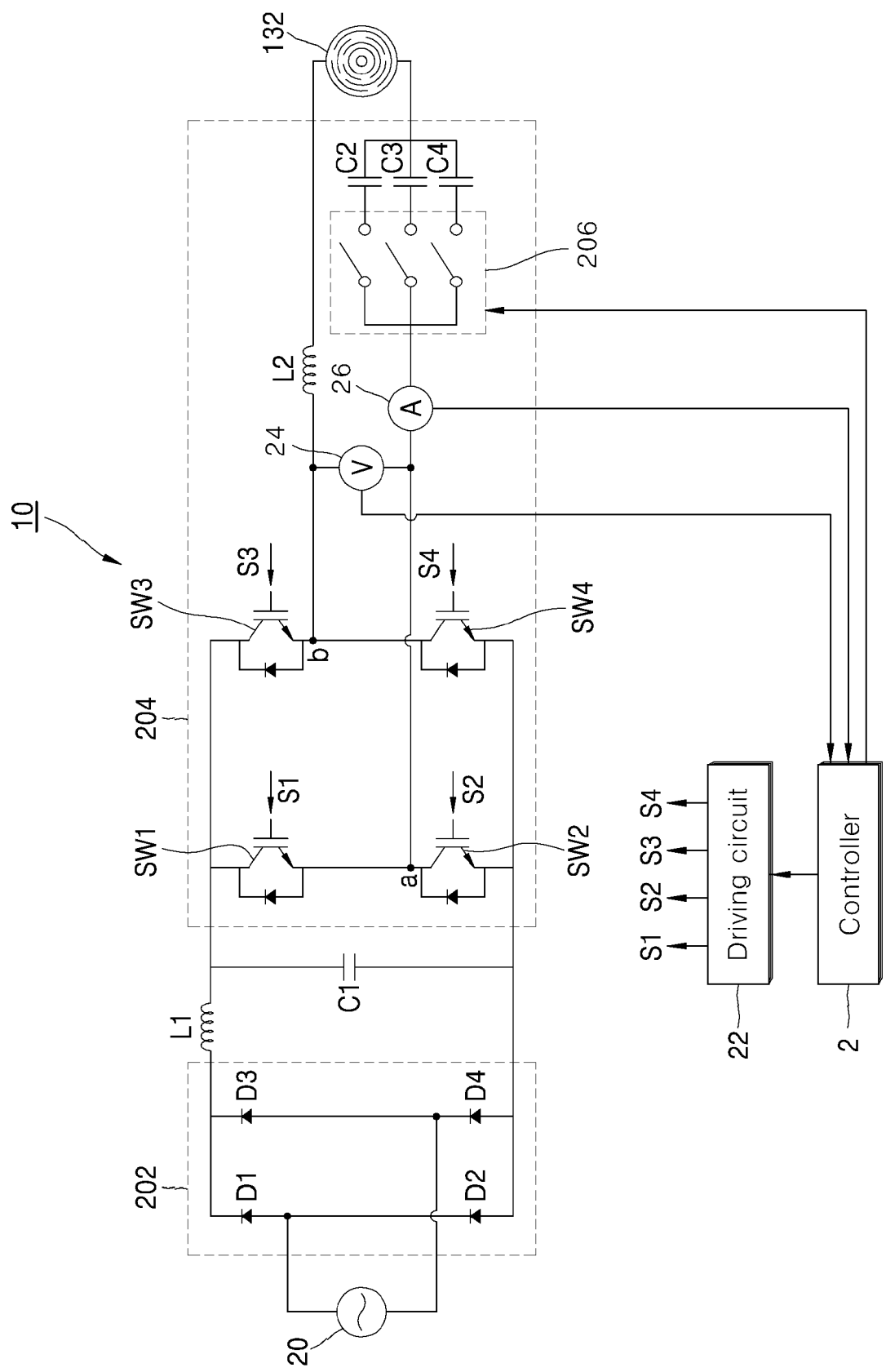
FIG. 4 is a circuit diagram of an induction heating apparatus according to one embodiment.

FIG. 4 is a circuit diagram of an induction heating apparatus 10 according to one embodiment.

Referring to FIG. 4, the induction heating apparatus 10 according to one embodiment may include a rectifier circuit 202, a smoothing circuit L1, C1, an inverter circuit 204, a working coil 132, a driving circuit 22, and a controller 2.

The rectifier circuit 202 may include a plurality of diode elements D1, D2, D3, D4. The rectifier circuit 202, as illustrated in FIG. 4, may be a bridge diode circuit, and may be a different circuit depending on embodiments. The rectifier circuit 202 may rectify AC input voltage supplied from a power supply device 20 to output voltage having a pulse waveform.

The smoothing circuit L1, C1 may smooth the voltage rectified by the rectifier circuit 32 and output DC link voltage. The smoothing circuit L1, C1 may include a first inductor L1 and a DC link capacitor C1.

The inverter circuit 204 may include a first switching element SW1, a second switching element SW2, a third switching element SW3, a fourth switching element SW4, a second inductor L2, a variable capacitors C2, C3, C4 including a plurality of capacitors, and a relay part 206.

As illustrated in FIG. 4, the inverter circuit 204 of the induction heating apparatus 10 according to one embodiment may be implemented as a full bridge circuit including four switching elements SW1, SW2, SW3, SW4. The inverter circuit 204 may be driven and switched between or changed into a full bridge circuit or a half bridge circuit as a result of control by a controller 2 described below.

A first switching element SW1, a second switching element SW2, a third switching element SW3, and a fourth switching element SW4 may be turned on and turned off by a first switching signal S1, a second switching signal S2, a third switching signal S3, and a fourth switching signal S4 respectively output from the driving circuit 22. Each of the switching elements SW1, SW2, SW3, SW4 may be turned on when each of the switching signals S1, S2, S3, S4 is at a high level, and may be turned off when each of the switching signals S1, S2, S3, S4 is at a low level.

FIG. 4 shows an IGBT element as each of the switching elements SW1, SW2, SW3, SW4. However, each of the switching elements SW1, SW2, SW3, SW4 may be different types of switching elements (e.g., a BJT or FET element and the like) depending on embodiments.

Any switching elements among the switching elements SW1, SW2, SW3, SW4 may be turned on and turned off complementarily. For example, in any operation mode, the second switching element SW2 may be turned off (turned on) while the first switching element SW1 is turned on (turned off). In the present disclosure, the switching elements that are turned on and turned off complementarily are referred to as "mutually complementary" switching elements.

Additionally, any switching elements among the switching elements SW1, SW2, SW3, SW4 may be turned on and turned off identically. For example, in any operation mode, the first switching element SW1 and the third switching element SW3 may be turned on and turned off at the same timing. In the disclosure, the switching elements that are turned on and turned off at the same timing are referred to as "mutually corresponding" switching elements.

DC link voltage input to the inverter circuit 204 may be converted into AC voltage (AC current) as a result of turn-on and turn-off operations, i.e., switching operations, of the switching elements SW1, SW2, SW3, SW4 included in the inverter circuit 204. The AC voltage (AC current) converted by the inverter circuit 204 may be supplied to the second inductor L2, the working coil 132 and the plurality of variable capacitors C2, C3, C4. When the AC voltage (AC current) is supplied by the inverter circuit 204, resonance may occur in the working coil 132, and thermal energy may be supplied to a container.

In the disclosure, the first switching signal S1, the second switching signal S2, the third switching signal S3 and the fourth switching signal S4 may be pulse width modulation (PWM) signals that respectively have a predetermined duty ratio.

The relay part 206 may include a plurality of relays connected in series with each of the variable capacitors C2, C3, C4. Each relay included in the relay part 206 may be opened or closed by a control signal of the controller 2.

In the present disclosure, depending on the number of the relays that are closed as a result of control by the controller 2, an entire capacitance value of the variable capacitors C2, C3, C4 may vary. That is, the controller 2 may adjust a capacitance value of the variable capacitors C2, C3, C4 by opening or closing each of the relays included in the relay part 206.

In one embodiment, the controller 2 may determine an operation mode of the induction heating apparatus, and may control open/close state of each of the relays included in the relay part 205 such that the capacitance value of the variable capacitors C2, C3, C4 corresponds to the operation mode of the induction heating apparatus 10.

As described below, a frequency of resonance current following in the working coil 132 may be adjusted based on the capacitance value of the variable capacitors C2, C3, C4.

In the embodiment of FIG. 4, the variable capacitor part may include three capacitors connected in parallel. However, the number of the capacitors included in the variable capacitor part may vary depending on embodiments. Additionally, a connection (in series or in parallel) of the capacitors included in the variable capacitor part may differ depending on embodiments.

When AC current output from the inverter circuit 204 is supplied to the working coil 132, the working coil 132 may be driven. As a result of driving of the working coil 132, eddy current may flow in the container placed over the working coil 132, and the container may be heated. When the working coil 132 is driven, magnitude of thermal energy supplied to the container may differ depending on magnitude of power that is actually generated as a result of driving of the working coil 132, i.e., depending on an output power value of the working coil.

The controller 2 may determine a driving frequency of the working coil 132 such that the driving frequency corresponds to a power level of a heating zone 12, 14 set by the user.

In one embodiment, the controller 2 may determine a driving frequency of the working coil 132 with reference to a table in which a driving frequency corresponding to each power level is listed or with reference to an Equation of a relationship between each power level and a driving frequency.

Additionally, magnitude of power, i.e., a required power value, output by the working coil 132 may be determined based on the power level set by the user.

The controller 2 may supply the driving circuit 22 with a control signal corresponding to the determined driving frequency. The driving circuit 22 may output switching signals S1, S2, S3, S4 having a duty ratio corresponding to the driving frequency determined by the controller 2, based on the control signal output from the controller 2.

When the induction heating apparatus 10 is powered on as a result of the user's manipulation of the interface 114 of the induction heating apparatus 10, the induction heating apparatus 10 may be in a driving standby state as power is supplied to the induction heating apparatus from an input power source 20. Then the user may input a heating initiation instruction for the working coil 132 by placing a container over a working coil 132 of the induction heating apparatus 10 and setting a power level for the container. When the user inputs the heating initiation instruction, a power value required by the working coil 132, i.e., a required power value may be determined depending on the power level set by the user.

Having received the user's heating initiation instruction, the controller 2 may determine a driving frequency corresponding to the required power value of the working coil 132, and may supply a control signal corresponding to the determined driving frequency to the driving circuit 22. Accordingly, the driving circuit 22 may output switching signals S1, S2, S3, S4, and the working coil 132 may be driven as the switching signals S1, S2, S3, S4 are respectively input to the switching elements SW1, SW2, SW3, SW4. As a result of driving of the working coil 132, eddy current may flow in the container, and the container may be heated.

A process of controlling the induction heating apparatus 10 according to embodiments is described hereunder with reference to FIGS. 3 to 17.

When the user sets a power level of a heating zone 12, 14 and inputs a heating initiation instruction in a state in which a container is placed in the heating zone 12, 14, the controller 2 may set a driving frequency of a working coil 132 to a first predetermined reference frequency. In this case, the first reference frequency may be set to twice a minimum frequency fmin of the working coil 132, i.e., a 2×fmin.

In the disclosure, the minimum frequency fmin of the working coil 132 denotes a lowest value that can be set by the controller 2 among driving frequencies of the working coil 132. The minimum frequency fmin is any value that can be differently set depending on embodiments. The minimum frequency fmin may be set to a value the same as or greater than a resonance frequency of the working coil 132. When the working coil 132 is driven at the minimum frequency fmin, an output power value of the working coil 132 may be maximized.

The controller 2 may supply a control signal to the driving circuit 22 such that the driving circuit 22 outputs switching signals S1, S2, S3, S4 corresponding to the first reference frequency, i.e., 2×fmin. Accordingly, the switching signals S1, S2, S3, S4 output from the driving circuit 22 may be respectively input to the switching elements SW1, SW2, SW3, SW4, and the working coil 132 may be driven.

When the working coil 132 is driven, the controller 2 may obtain an input voltage value Vin and an input current value Iin, which are magnitude of input voltage and input current input to the working coil 132 as a result of switching operations of the switching elements SW1, SW2, SW3, SW4, respectively from a voltage detector 24 and a current detector 26.

The controller 2 may calculate a resistance value of the container over the working coil 132 based on the input voltage value Vin and the input current value Iin.

For example, under the assumption that impedance of a container is Z, an Equation Z=Vin/Iin is established. The controller 2 may calculate a phase φ of the input voltage value Vin (or a phase of the impedance Z) with respect to the input current value Iin as in the following equation (Equation 1).

$$\Phi = \arctan(Im(Z)/Re(Z)) \qquad \text{[Equation 1]}$$

In Equation 1, Im (Z) and Re (Z) denote an imaginary number part and a real number part of the impedance Z respectively. The controller 2 may also calculate the phase φ of the impedance Z using arcsin or acrcos rather than arctan depending on embodiments.

The controller 2 may calculate an effective power value We of the container based on Equation 2.

$$We = Re(Vin \times Iin^*)/2 \qquad \text{[Equation 2]}$$

Further, the controller 2 may calculate an effective value Ie of current flowing in the container based on Equation 3.

$$Ie = \sqrt{Iin \times Iin^*}/2 \qquad \text{[Equation 3]}$$

In Equation 2 and Equation 3, Iin* denotes complex conjugate of Iin.

Finally, the controller 2 may calculate the resistance value R of the container based on Equation 4.

$$R = We/Ie^2 \qquad \text{[Equation 4]}$$

The above processes of calculating a resistance value of a container based on Equation 1 to Equation 4 are provided only as examples. In another embodiments, the controller 2 may calculate a resistance value of a container based on another well-known method and circuit configuration.

The controller 2 may compare the calculated resistance value of the container with a first reference resistance value K1 predetermined. In one embodiment, the controller 2 may set the first reference resistance value K1 to $R_{pot, d, max}$ based on the following Equation (Equation 5).

$$R_{pot,d,max} = \frac{G_{max} \cdot V_{in}^2}{4 P_{rated}} \qquad \text{[Equation 5]}$$

In Equation 5, $G_{max}$ denotes a maximum voltage gain, which is a maximum value among voltage gains. The voltage gain is a ratio of an input voltage value Vin, which is magnitude of input voltage input to the working coil 132, to an output voltage value, which is magnitude of voltage output by the working coil 132. In Equation 5, $V_{in}$ denotes an input voltage value that is magnitude of voltage input to the working coil 132. Additionally, $P_{rated}$ denotes maximum rated power of the induction heating apparatus.

When the resistance value of the container is less than the first reference resistance value K1 as a result of comparison between the calculated resistance value of the container and the first reference resistance value K1, the controller 2 may set an operation mode of the induction heating apparatus 10 to a frequency doubler mode.

If the resistance value of the container less than the first reference resistance value K1, it means that a power conversion efficiency of the container is low.

Accordingly, the controller 2 may set the operation mode of the induction heating apparatus 10 to the frequency doubler mode such that a resonance frequency band and a driving frequency band of the working coil 132 are increased.

Figure 5:
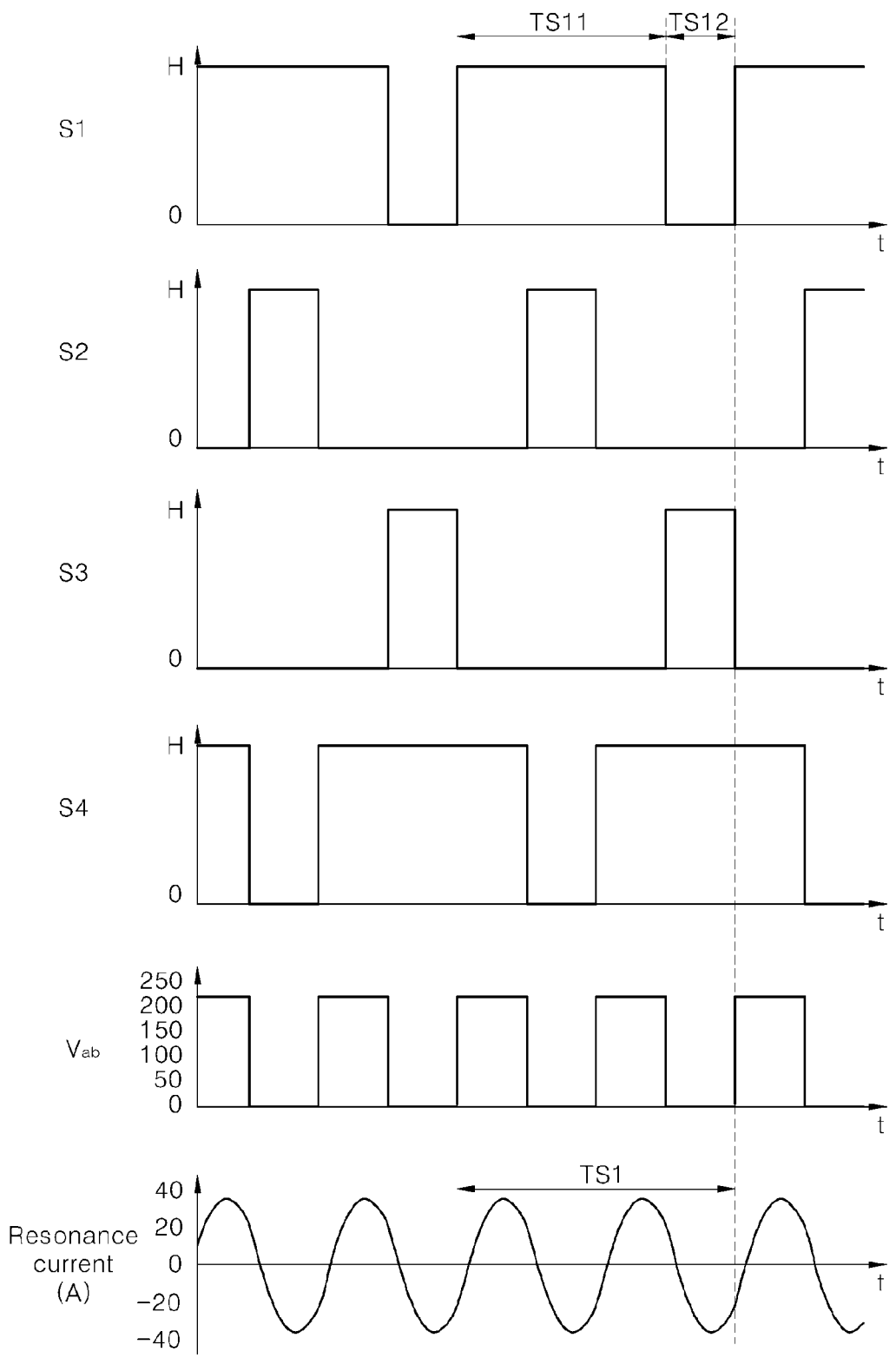
FIG. 5 shows waveforms of switching signals, input voltage and resonance current when an operation mode of an induction heating apparatus is a frequency doubler mode, respectively, in one embodiment.

FIG. 5 shows waveforms of switching signals, input voltage and resonance current when an operation mode of an induction heating apparatus is a frequency doubler mode, respectively, in one embodiment.

When the operation mode of the induction heating apparatus 10 is determined as the frequency doubler mode, the controller 2 may supply a control signal to the driving circuit 22 such that the driving circuit 22 outputs switching signals S1, S2, S3, S4 having waveforms illustrated in FIG. 5.

The controller 2, as illustrated in FIG. 5, may set a capacitance value of the variable capacitor part C1, C2, C3 to $C_{r,d}$ as in the following equation (Equation 6) such that resonance current supplied to the working coil 132 is output twice during a first cycle TS1 of the switching signal S1, S2, S3, S4, in other words, such that a frequency of resonance current supplied to the working coil 132 becomes twice of a frequency of the switching signal S1, S2, S3, S4.

$$C_{r,d} = \frac{1}{(2\pi f_{r,d})^2 L_r} \qquad \text{[Equation 6]}$$

In Equation 6, $f_{r,d}$ denotes twice the frequency of the switching signal S1, S2, S3, S4, and $L_r$ denotes an inductance value of the second inductor L2.

The controller 2 may open or close each of the relays included in the relay part 206 such that an entire capacitance value of the variable capacitor part C1, C2, C3 matches the capacitance value $C_{r,d}$ in Equation 6. When adjustment of the capacitance value of the variable capacitor part C1, C2, C3 is completed, the controller 2 may supply the inverter circuit 204 with switching signals S1, S2, S3, S4 having waveforms illustrated in FIG. 5 through the driving circuit 22. As a result, a process of heating the container may be performed.

As illustrated in FIG. 5, each of the switching signals may have a turn-on section and a turn-off section within the first cycle TS1. In the disclosure, time in the turn-on section is referred to as turn-on time TS11, and time in the turn-off section is referred to as turn-off time TS12. Additionally, a ratio of the turn-on time TS11 to the first cycle TS1 is referred to as a duty ratio of the switching signal. For example, under the assumption that the first cycle TS1 of the first switching signal S1 is one second and that the turn-on time TS11 is 0.5 second, the duty ratio of the first switching signal S1 is 50% (or 0.5).

Referring to FIG. 5, the first switching element SW1 and the third switching element SW3 may be complementarily turned-on and turned-off. The second switching element SW2 and the fourth switching element SW4 may be complementarily turned-on and turned-off.

FIG. 5 also shows a waveform of Vab that is magnitude of voltage between a node and b node in the circuit diagram of FIG. 4. Herein, Vab is the same as an input voltage value Vin that is magnitude of input voltage input to the working coil 132. FIG. 5 also shows a waveform of input current, i.e., resonance current, input to the working coil 132.

When the operation mode of the induction heating apparatus 10 is the frequency doubler mode as illustrated in FIG. 5, the input voltage Vab and the resonance current have the same frequency. Additionally, the frequencies of the input voltage Vab and the resonance current have twice the frequency of the switching signal S1, S2, S3, S4. Accordingly, even if the resonance frequency band and the driving frequency band of the working coil 132 are increased, the voltage gain of the working coil 132 may be maintained at a maximum value (e.g., 1). When a container such as a non-magnetic container having low power conversion efficiency is used, the input current value Iin of the working coil 132 may not increase, and power may be supplied to the container reliably.

When the operation mode of the induction heating apparatus 10 is determined as the frequency doubler mode, the controller 2 may determine a power control mode of the induction heating apparatus 10 as an asymmetric pulse width modulation mode. In the asymmetric pulse width modulation mode, the controller 2 may adjust the duty ratio of the switching signal S1, S2, S3, S4 while maintaining the frequency of the switching signal S1, S2, S3, S4 to adjust the output power value of the working coil 132.

Figure 6:
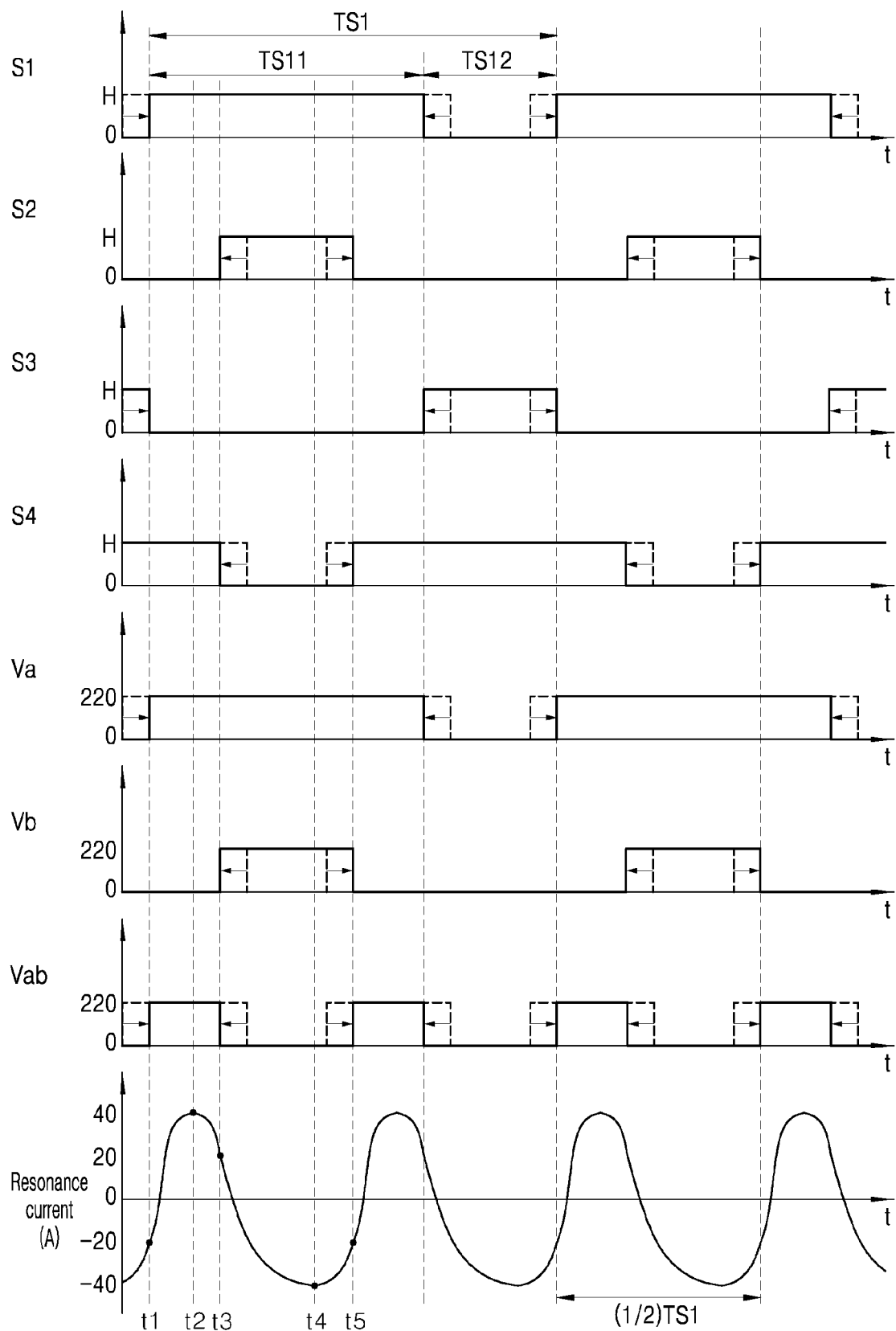
FIG. 6 shows waveforms of switching signals, input voltage, and resonance current when an operation mode of an induction heating apparatus is a frequency doubler mode and a power control mode of the induction heating apparatus is an asymmetric pulse width modulation mode, respectively, in one embodiment.

FIG. 6 shows waveforms of switching signals, input voltage, and resonance current when an operation mode of an induction heating apparatus is a frequency doubler mode and a power control mode of the induction heating apparatus is an asymmetric pulse width modulation mode, respectively, in one embodiment.

When the power control mode of the induction heating apparatus 10 is determined as the asymmetric pulse width modulation mode, the controller 2 may adjust the duty ratio of the switching signal S1, S2, S3, S4. As illustrated in FIG. 6, magnitude Vab of input voltage and magnitude of resonance current may respectively change depending on the turn-on time TS11 of the first switching signal S1 and the third switching signal S3 (or the turn-off time of the second switching signal S2 and the fourth switching signal S4), and the turn-on time TS12 of the second switching signal S2 and the fourth switching signal S4 (or the turn-off time of the first switching signal S1 and the third switching signal S3). Since the output power value of the working coil 132 varies depending on the magnitude Vab of the input voltage and the magnitude of the resonance current, the controller 2 may adjust the output power value of the working coil 132 by adjusting the turn-on time TS11 of the first switching signal S1 and the third switching signal S3, i.e., the duty ratio of the first switching signal S1 and the third switching signal S3.

For example, the controller 2 may increase the output power value of the working coil 132 by increasing the turn-on time TS11 of the first switching signal S1 and the third switching signal S3, in other words, by increasing the duty ratio of the first switching signal S1 and the third switching signal S3. On the contrary, the controller 2 may decrease the output power value of the working coil 132 by decreasing the turn-on time TS11 of the first switching signal S1 and the third switching signal S3, in other words, by decreasing the duty ratio of the first switching signal S1 and the third switching signal S3.

Figure 7:
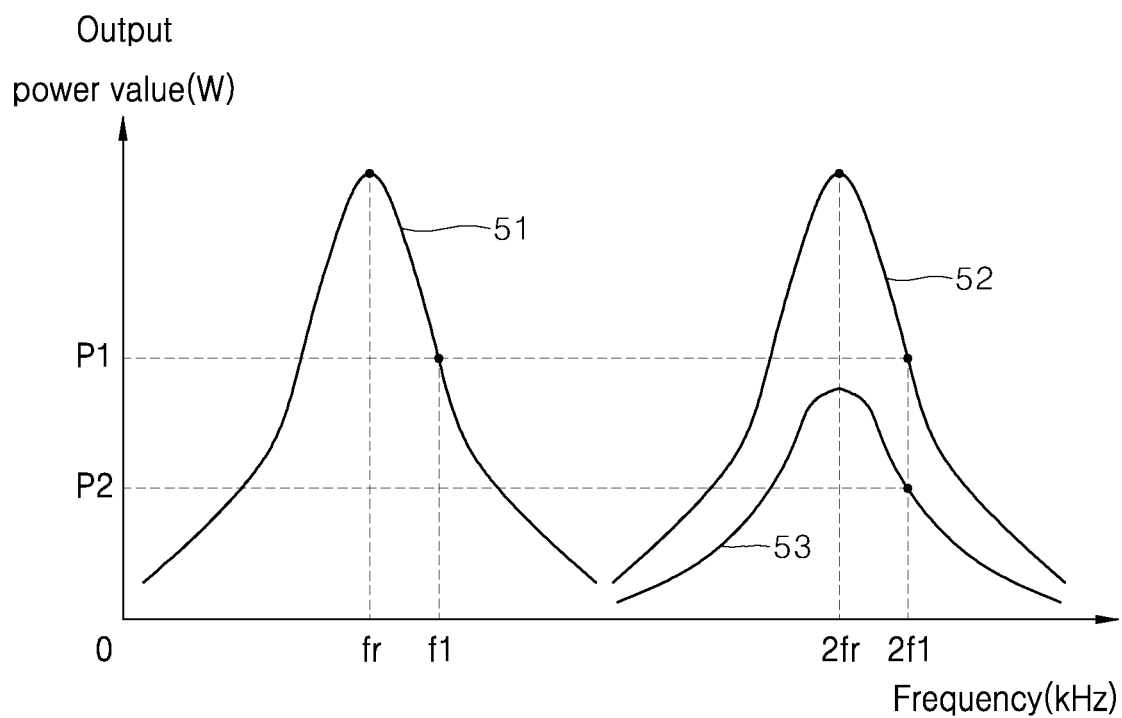
FIG. 7 is a graph showing a curve of a resonance characteristic of a working coil when an operation mode of an induction heating apparatus is a frequency doubler mode, in one embodiment.

FIG. 7 is a graph showing a curve of a resonance characteristic of a working coil when an operation mode of an induction heating apparatus is a frequency doubler mode, in one embodiment.

FIG. 7 shows a curve 51 of a resonance characteristic of the working coil 132 in a full bridge operation mode of the induction heating apparatus 10, and a curve 52 of a resonance characteristic of the working coil 32 in the frequency doubler operation mode of the induction heating apparatus 10, respectively.

When the controller 2 sets the operation mode of the induction heating apparatus 10 to the frequency doubler mode as described above, a frequency of resonance current of the working coil 132 may be set to twice the frequency of the switching signal S1, S2, S3, S4. Accordingly, the resonance frequency of the working coil 132 may be changed to 2×fr that is twice of fr, as in FIG. 7.

When the resonance frequency fr of the working coil 132 becomes higher as described, a driving frequency of the working coil 132 with respect to the same output power value may also become higher. For example, in the full bridge mode, the driving frequency of the working coil 132 needs to be set to f1 such that the working coil 132 outputs power of P1. However, in the frequency doubler mode, the driving frequency of the working coil 132 needs to be set to 2×f1 that is twice of f1 such that the working coil 132 outputs the power of P1, as shown in the right part of FIG. 7.

As described above, the driving frequency band of the working coil 132 in the frequency doubler mode may be greater than in the full bridge mode. However, as described with reference to FIG. 5, the frequency of the input voltage and the frequency of the resonance current may be maintained at the same level, and the voltage gain may be set to a maximum value. Accordingly, although the driving frequency of the working coil 132 is not set to a high frequency, the output power value of the working coil 132 may be maintained at a high level.

FIG. 7 shows a curve 52 of a resonance characteristic of the working coil 132 at a 50% duty ratio of the first switching signal S1 and the third switching signal S3 in the frequency doubler mode, and a curve 53 of a resonance characteristic of the working coil 132 at a 30% duty ratio of the first switching signal S1 and the third switching signal S3 in the frequency doubler mode, respectively.

When the driving frequency of the working coil 132 is 2×f1 in the frequency doubler mode and the duty ratio of the first switching signal S1 and the third switching signal S3 is set to 50% as illustrated in FIG. 7, the output power value of the working coil 132 may be P1.

However, when the controller 2 reduces the duty ratio of the first switching signal S1 and the third switching signal S3 from 50% to 30% while maintaining the driving frequency of the working coil 132, the output power value of the working coil 132 may be reduced to P2.

Accordingly, the controller 2 may adjust the output power value of the working coil 132 only by adjusting the duty ratio of the first switching signal S1 and the third switching signal S3 according to the asymmetric pulse width modulation method while maintaining the driving frequency of the working coil 132 at the same value (e.g., 2×f1) in the frequency doubler mode.

Figure 8:
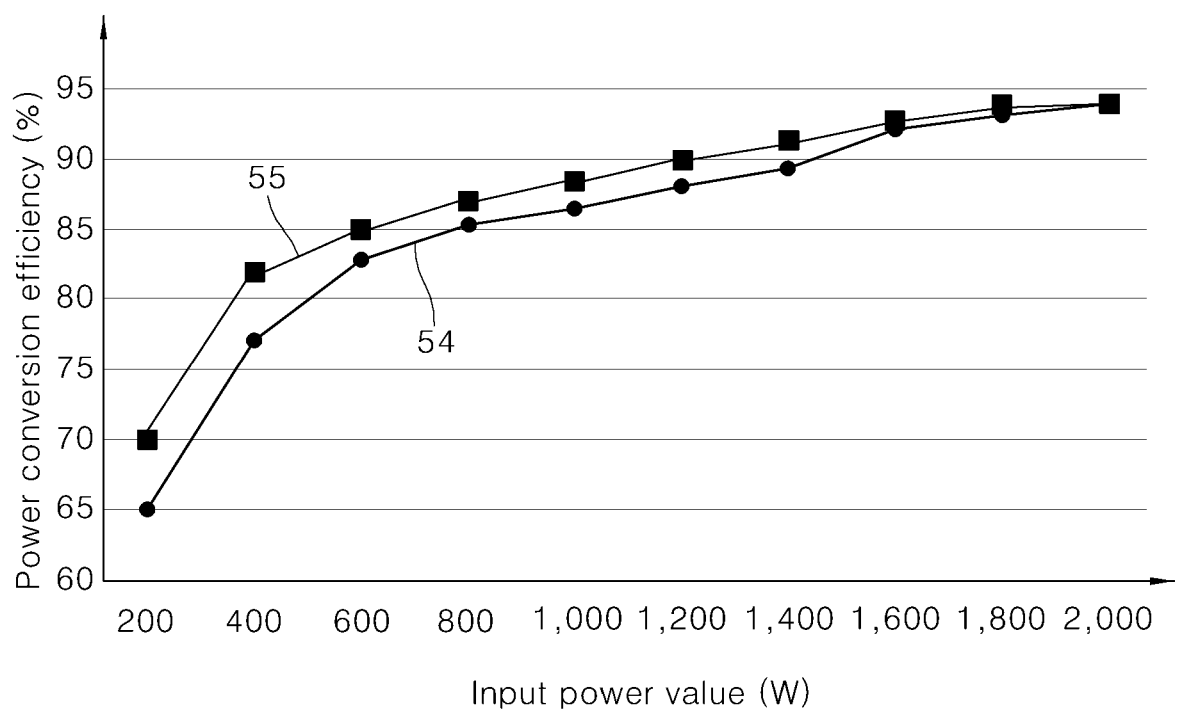
FIG. 8 is a graph showing power conversion efficiency of an induction heating apparatus when a power control mode of the induction heating apparatus is set to a pulse frequency modulation mode and an asymmetric pulse width modulation mode in a state in which an operation mode of the induction heating apparatus is a frequency doubler mode, respectively, in one embodiment.

FIG. 8 is a graph showing power conversion efficiency of an induction heating apparatus when a power control mode of the induction heating apparatus is set to a pulse frequency modulation mode and an asymmetric pulse width modulation mode in a state in which an operation mode of the induction heating apparatus is a frequency doubler mode, respectively, in one embodiment.

FIG. 8 shows a graph 54 of power conversion efficiency with respect to each input power value when the power control mode of the induction heating apparatus 10 is the pulse frequency modulation mode, that is, when the controller 2 adjusts the driving frequency of the working coil 132 to adjust the output power value of the working coil 132, in the state in which the operation mode of the induction heating apparatus 10 is the frequency doubler mode.

FIG. 8 also shows a graph 55 of power conversion efficiency with respect to each input power value when the power control mode of the induction heating apparatus 10 is the asymmetric pulse width modulation mode, that is, when the controller 2 adjusts the duty ratio of the switching signal without changing the driving frequency of the working coil 132 to adjust the output power value of the working coil 132, in the state in which the operation mode of the induction heating apparatus 10 is the frequency doubler mode.

In FIG. 8, the power conversion efficiency denotes a ratio of power actually delivered to a container to power input to the working coil 132. For example, when the power input to the working coil 132 is 1000 W and the power conversion efficiency is 80%, 800 W of power may be actually delivered to a container.

As illustrated in FIG. 8, over the entire range of input power values, the power conversion efficiency in the power control mode of the induction heating apparatus 10 set to the asymmetric pulse width modulation mode is greater than the power conversion efficiency in the power control mode of the induction heating apparatus 10 set to the pulse frequency modulation mode. Accordingly, the power conversion efficiency of the working coil 132 of the induction heating apparatus according to the disclosure is increased compared to the induction heating apparatus of the related art, by adjusting the output power value of the working coil 132 using the asymmetric pulse width modulation method in the state in which the operation mode of the induction heating apparatus 10 is set to the frequency doubler mode.

On the other hand, if a resistance value of the container, calculated in the state in which the first reference resistance value is set to K1($R_{pot,\ d,\ max}$), is not less than the first reference resistance value, the controller 2 may set the first reference frequency to the minimum frequency fmin of the working coil 132, and may drive the working coil 132 at the first reference frequency.

The controller 2 may recalculate a resistance value of the container in the state in which the driving frequency of the working coil 132 is set to the minimum frequency fmin of the working coil 132, and may compare the recalculated resistance value of the container with a second reference resistance value K2. In one embodiment, the controller 2 may set the second reference resistance value K2 to $R_{pot,\ h,\ max}$ as in the following equation (Equation 7).

$$R_{pot,h,max} = \frac{G_{max} \cdot V_{in}^2}{4P_{rated}} \quad \text{[Equation 7]}$$

When the resistance value of the container is less than the second reference resistance value K2 as a result of comparison between the recalculated resistance value of the container and the second reference resistance value K2, the controller 2 may set the operation mode of the induction heating apparatus 10 to a half bridge mode.

Figure 9:
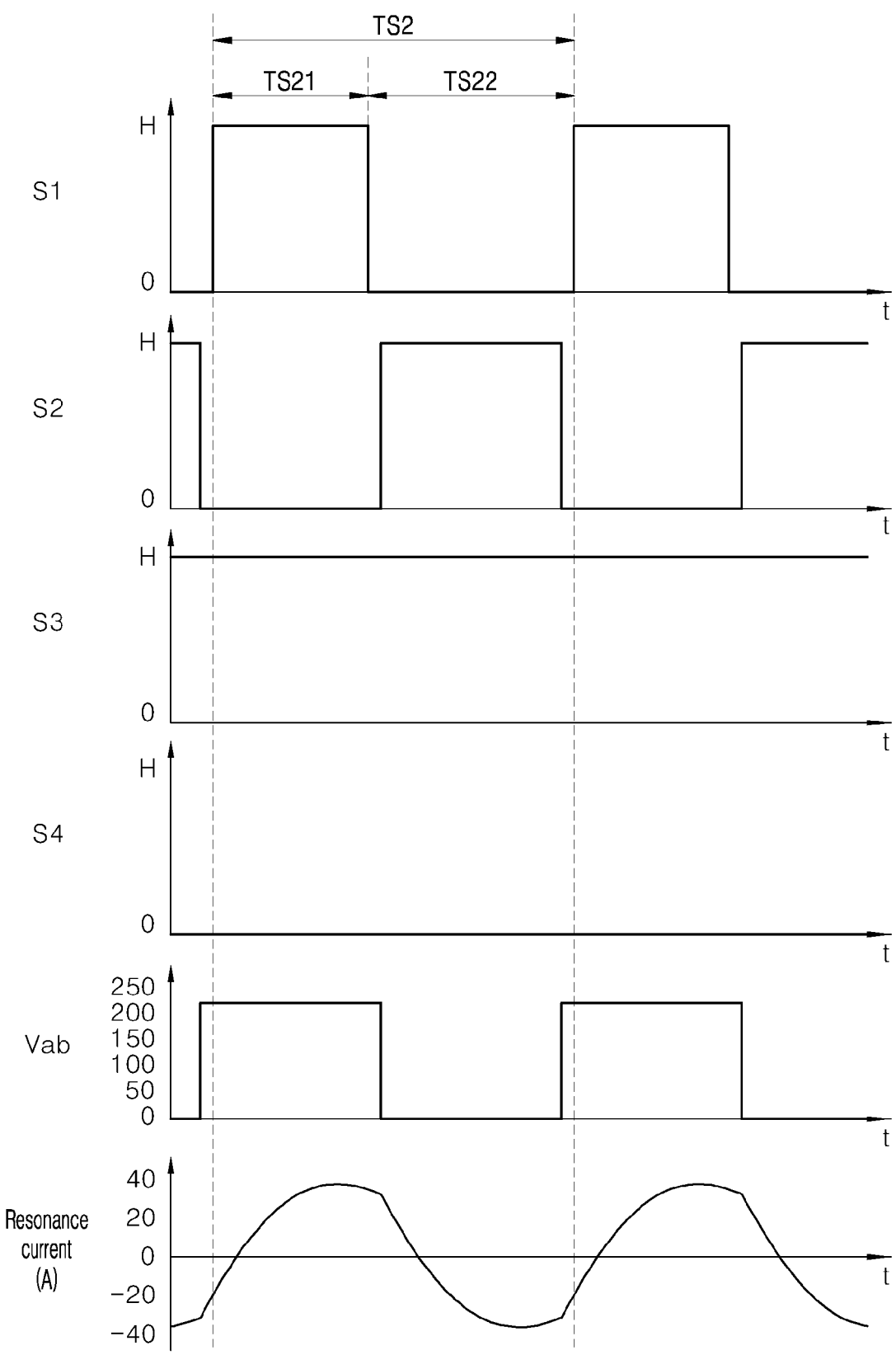
FIG. 9 shows waveforms of switching signals, input voltage and resonance current when an operation mode of an induction heating apparatus is a half bridge mode, respectively, in one embodiment.

FIG. 9 shows waveforms of switching signals, input voltage and resonance current when an operation mode of an induction heating apparatus is a half bridge mode, respectively, in one embodiment.

When the operation mode of the induction heating apparatus 10 is determined as the half bridge mode, the controller 2 may supply a control signal to the driving circuit 22 such that the driving circuit 22 outputs switching signals S1, S2, S3, S4 having waveforms illustrated in FIG. 9.

Additionally, the controller 2, as illustrated in FIG. 9, may set a capacitance value of the variable capacitor part C1, C2, C3 to Cr,h as in the following equation (Equation 8) such that resonance current supplied to the working coil 132 is output once during the first cycle TS1 of the switching signal S1, S2, S3, S4, in other words, such that a frequency of resonance current supplied to the working coil 132 becomes a same value as a frequency of the switching signal S1, S2, S3, S4.

$$C_{r,h} = \frac{1}{(2\pi f_{r,h})^2 L_r} \quad \text{[Equation 8]}$$

In Equation 8, $f_{r,h}$ is the same frequency as the driving frequency of the switching element SW1, SW2, SW3, SW4.

The controller 2 may open or close each of the relays included in the relay part 206 such that an entire capacitance value of the variable capacitor part C1, C2, C3 matches the capacitance value $C_{r,h}$ in Equation 8. When adjustment of the capacitance value of the variable capacitor part C1, C2, C3 is completed, the controller 2 may supply the inverter circuit 204 with switching signals S1, S2, S3, S4 having waveforms illustrated in FIG. 9 through the driving circuit 22. As a result, a process of heating the container may be performed.

Referring to FIG. 9, the first switching element SW1 and the second switching element SW2 may be complementarily turned-on and turned-off. The third switching element SW3 may be kept on and the fourth switching element SW4 may be kept off.

FIG. 9 shows a waveform of Vab that is magnitude of voltage between a node and b node in the circuit diagram of FIG. 4. Herein, Vab is the same as an input voltage value Vin that is magnitude of input voltage input to the working coil 132. FIG. 9 also shows a waveform of input current, i.e., resonance current, input to the working coil 132.

When the operation mode of the induction heating apparatus 10 is the half bridge mode as illustrated in FIG. 9, the input voltage Vab and the resonance current have the same frequency. Additionally, the frequency of the input voltage Vab and the resonance current is the same value as a frequency of the switching signal S1, S2, S3, S4. Accordingly, since a voltage gain of the working coil 132 may be maintained at a maximum value (e.g., 1), power may be supplied to the container reliably.

When the operation mode of the induction heating apparatus 10 is determined as the half bridge mode, the controller 2 may determine the power control mode of the induction heating apparatus 10 as the asymmetric pulse width modulation mode. In the asymmetric pulse width modulation mode, the controller 2 may adjust the duty ratio of the switching signal S1, S2, S3, S4 while maintaining the frequency of the switching signal S1, S2, S3, S4 to adjust the output power value of the working coil 132.

Figure 10:
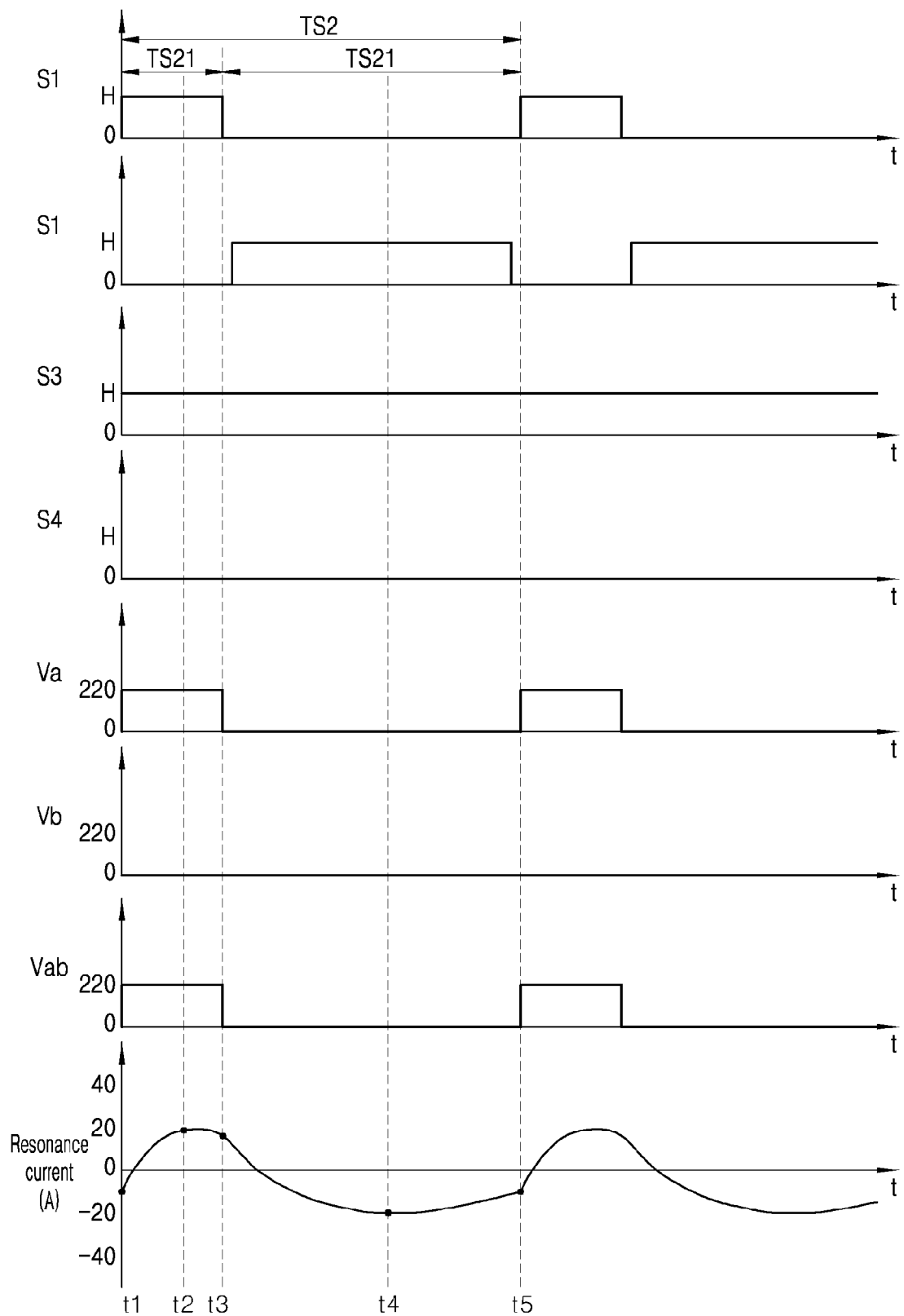
FIG. 10 shows waveforms of switching signals, input voltage and resonance current when an operation mode of an induction heating apparatus is a half bridge mode and when a power control mode of the induction heating apparatus is an asymmetric pulse width modulation mode, respectively, in one embodiment.

FIG. 10 shows waveforms of switching signals, input voltage and resonance current when an operation mode of an induction heating apparatus is a half bridge mode and when a power control mode of the induction heating apparatus is an asymmetric pulse width modulation mode, respectively, in one embodiment.

When the power control mode of the induction heating apparatus 10 is determined as the asymmetric pulse width modulation mode, the controller 2 may adjust the duty ratio of the switching signal S1, S2, S3, S4. As illustrated in FIG. 10, magnitude Vab of input voltage and magnitude of resonance current may respectively change depending on turn-on time TS21 of the first switching signal S1 (or turn-off time of the second switching signal S2), and turn-on time TS22 of the second switching signal S2 (or turn-off time of the first switching signal S1). Since the output power value of the working coil 132 varies depending on the magnitude Vab of the input voltage and the magnitude of the resonance current, the controller 2 may adjust the output power value of the working coil 132 by adjusting the turn-on time TS21 of the first switching signal S1, i.e., the duty ratio of the first switching signal S1.

For example, the controller 2 may increase the output power value of the working coil 132 by increasing the turn-on time TS21 of the first switching signal S1, in other words, by increasing the duty ratio of the first switching signal S1. On the contrary, the controller 2 may decrease the output power value of the working coil 132 by decreasing the turn-on time TS21 of the first switching signal S1, in other words, by decreasing the duty ratio of the first switching signal S1.

The duty ratio of the first switching signal S1 in the embodiment of FIG. 10 is less than in the embodiment of FIG. 9. Thus, the output power value of the working coil 132 in the embodiment of FIG. 10 is less than in the embodiment of FIG. 9.

Figure 11:
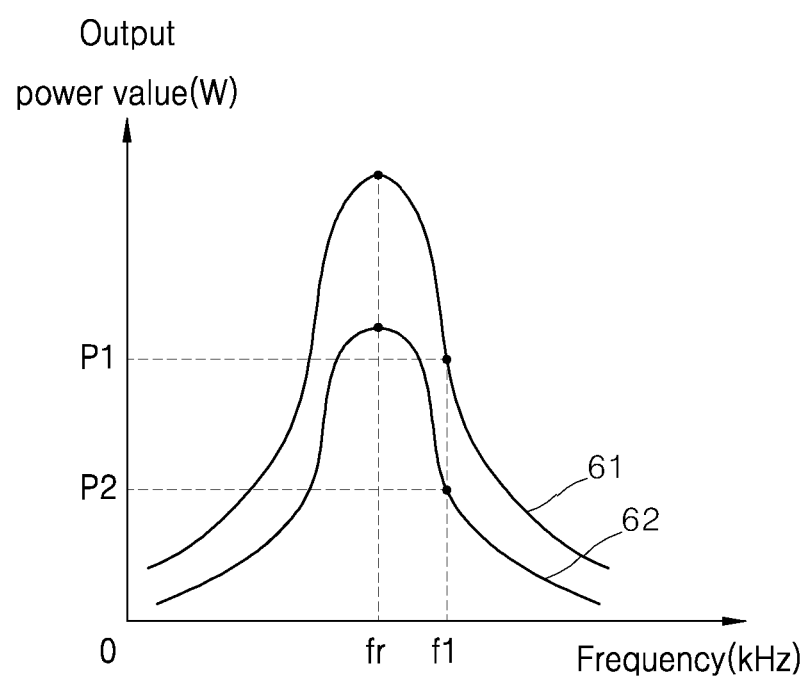
FIG. 11 is a graph showing a curve of a resonance characteristic of a working coil when an operation mode of an induction heating apparatus is a half bridge mode, in one embodiment.

FIG. 11 is a graph showing a curve of a resonance characteristic of a working coil when an operation mode of an induction heating apparatus is a half bridge mode, in one embodiment.

FIG. 11 shows a curve 61 of a resonance characteristic of the working coil 132 at a 50% duty ratio of the first switching signal S1 in the half bridge mode, and a curve 62 of a resonance characteristic of the working coil 132 at a 30% duty ratio of the first switching signal S1 in the half bridge mode, respectively. In FIG. 11, fr is a resonance frequency of the working coil 132.

When the driving frequency of the working coil 132 is f1 in the half bridge mode and the duty ratio of the first switching signal S1 is set to 50% as illustrated in FIG. 11, the output power value of the working coil 132 may be P1. However, when the controller 2 reduces the duty ratio of the first switching signal S1 from 50% to 30% while maintaining the driving frequency of the working coil 132 at f1, the output power value of the working coil 132 may be reduced to P2. Accordingly, the controller 2 may adjust the output power value of the working coil 132 only by adjusting the duty ratio of the first switching signal S1 according to the asymmetric pulse width modulation method while maintaining the driving frequency of the working coil 132 at the same value in the half bridge mode.

Figure 12:
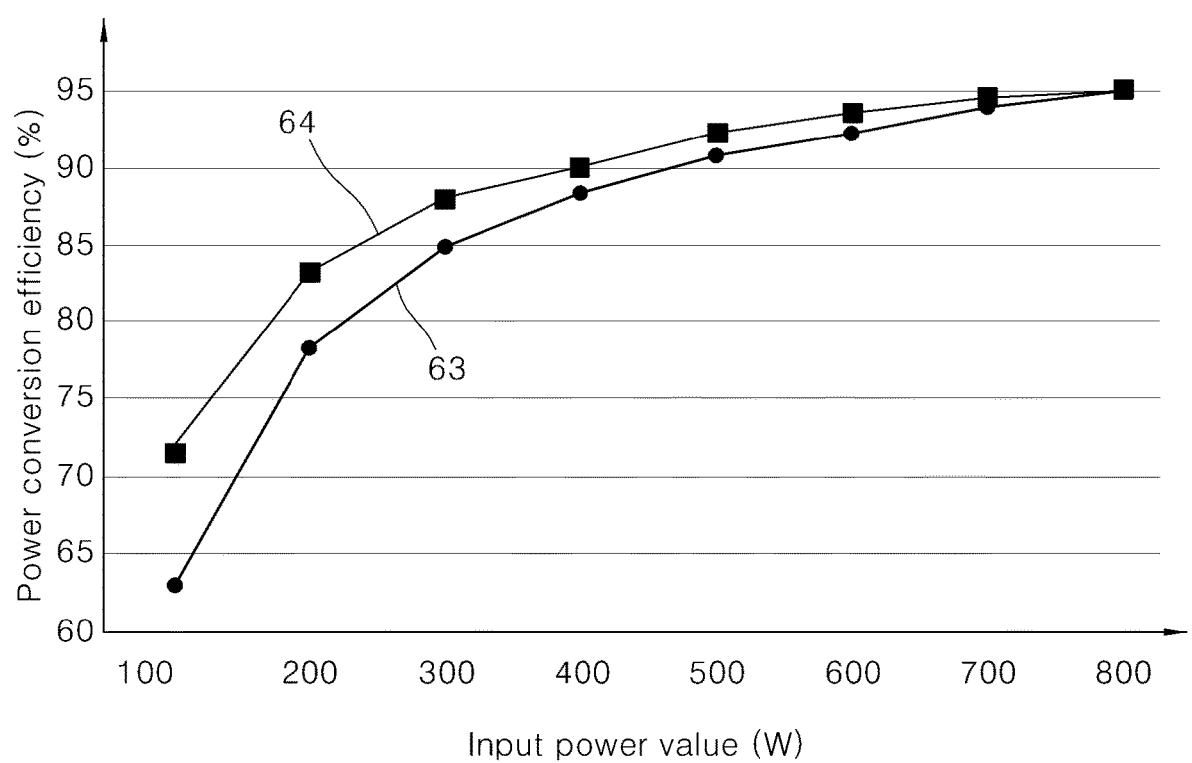
FIG. 12 is a graph showing power conversion efficiency of an induction heating apparatus when a power control mode of the induction heating apparatus is set to a pulse frequency modulation mode and an asymmetric pulse width modulation mode in a state in which an operation mode of the induction heating apparatus is a half bridge mode, respectively, in one embodiment.

FIG. 12 is a graph showing power conversion efficiency of an induction heating apparatus when a power control mode of the induction heating apparatus is set to a pulse frequency modulation mode and an asymmetric pulse width modulation mode in a state in which an operation mode of the induction heating apparatus is a half bridge mode, respectively, in one embodiment.

FIG. 12 shows a graph 63 of power conversion efficiency with respect to each input power value when the power control mode of the induction heating apparatus 10 is the pulse frequency modulation mode, that is, when the controller 2 adjusts the driving frequency of the working coil 132 to adjust the output power value of the working coil 132, in the state in which the operation mode of the induction heating apparatus 10 is the half bridge mode.

FIG. 12 also shows a graph 64 of power conversion efficiency with respect to each input power value when the power control mode of the induction heating apparatus 10 is the asymmetric pulse width modulation mode, that is, when the controller 2 adjusts the duty ratio of the switching signal without changing the driving frequency of the working coil 132 to adjust the output power value of the working coil 132, in the state in which the operation mode of the induction heating apparatus 10 is the half bridge mode.

As illustrated in FIG. 12, across an entire range of input power values, the power conversion efficiency in the power control mode of the induction heating apparatus 10 set to the asymmetric pulse width modulation mode is greater than in the power control mode of the induction heating apparatus 10 set to the pulse frequency modulation mode. Accordingly, the power conversion efficiency of the working coil 132 of the induction heating apparatus according to the disclosure is increased compared to the induction heating apparatus of the related art, by adjusting the output power value of the working coil 132 using the asymmetric pulse width modulation method in the state in which the operation mode of the induction heating apparatus 10 is set to the frequency doubler mode.

When the resistance value of the container is not less than the second reference resistance value K2 as a result of comparison between the resistance value of the container, calculated in the state in which the driving frequency of the working coil 132 is set to the minimum frequency fmin of the working coil 132, and the second reference resistance value K2, the controller 2 may set the operation mode of the induction heating apparatus 10 to the full bridge mode.

Then the controller 2 may compare the calculated resistance value of the container with a third reference resistance value K3 predetermined. In one embodiment, the controller 2 may set the third reference resistance value K3 to $R_{pot, f, max}$ as in the following equation (Equation 9).

$$R_{pot,f,max} = \frac{G_{max} \cdot V_{in}^2}{P_{rated}} \qquad [\text{Equation 9}]$$

When the resistance value of the container is not less than the third reference resistance value K3 as a result of comparison between the calculated resistance value of the container and the third reference resistance value K3, the controller 2 may limit the output power value of the working coil 132 to a limited power value or less while setting the operation mode of the induction heating apparatus 10 to the full bridge mode. The controller 2 may control the driving frequency of the working coil 132 to a predetermined limit frequency or greater to limit the output power value of the working coil 132 to the limited power value or less. The limit frequency is a driving frequency corresponding to the limited power value. For example, under the assumption that the driving frequency of the working coil 132 is 40 kHz and that the output power value of the working coil 132 is 2000 kHz, the controller 2 may set the limit frequency of the working coil 132 to 40 kHz such that the output power value of the working coil 132 is limited to the limited power value of 2000 kHz or less.

When the resistance value of the container is less than the third reference resistance value K3 as a result of comparison between the calculated resistance value of the container and the third reference resistance value K3, the controller 2 may set the operation mode of the induction heating apparatus 10 to the full bridge mode without limiting the output power value of the working coil 132.

Figure 13:
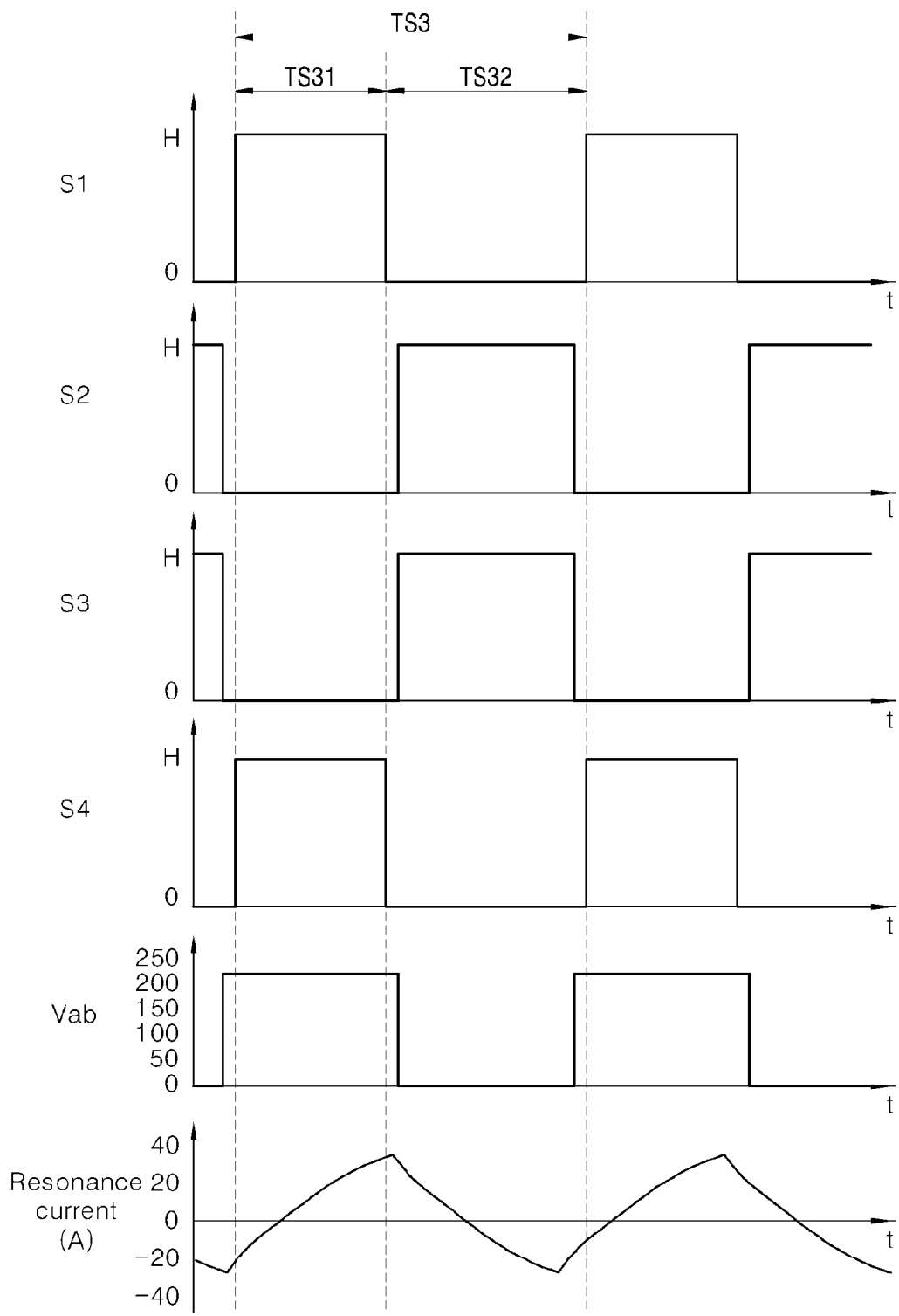
FIG. 13 shows waveforms of switching signals, input voltage and resonance current when an operation mode of an induction heating apparatus is a full bridge mode, respectively, in one embodiment.

FIG. 13 shows waveforms of switching signals, input voltage and resonance current when an operation mode of an induction heating apparatus is a full bridge mode, respectively, in one embodiment.

When the operation mode of the induction heating apparatus 10 is determined as the full bridge mode, the controller 2 may supply a control signal to the driving circuit 22 such that the driving circuit 22 outputs switching signals S1, S2, S3, S4 having waveforms illustrated in FIG. 13.

Additionally, the controller 2, as illustrated in FIG. 13, may set a capacitance value of the variable capacitor part C1, C2, C3 to Cr,f as in the following equation (Equation 10) such that resonance current supplied to the working coil 132 is output once during a first cycle TS1 of the switching signal S1, S2, S3, S4, in other words, such that a frequency of resonance current supplied to the working coil 132 becomes a same value as a frequency of the switching signal S1, S2, S3, S4.

$$C_{r,f} = \frac{1}{(2\pi f_{r,f})^2 L_r} \quad \text{[Equation 10]}$$

The controller 2 may open or close each of the relays included in the relay part 206 such that an entire capacitance value of the variable capacitor part C1, C2, C3 matches the capacitance value $C_{r,f}$ in Equation 10. When adjustment of the capacitance value of the variable capacitor part C1, C2, C3 is completed, the controller 2 may supply the inverter circuit 204 with the switching signals S1, S2, S3, S4 having waveforms illustrated in FIG. 13 through the driving circuit 22. As a result, the container may be heated.

Referring to FIG. 13, the first switching element SW1 and the second switching element SW2 may be complementarily turned-on and turned-off. The third switching element SW3 and the fourth switching element SW4 may be complementarily turned-on and turned-off.

FIG. 13 shows a waveform of Vab that is magnitude of voltage between a node and b node in the circuit diagram of FIG. 4. Herein, Vab is the same as an input voltage value Vin that is magnitude of input voltage input to the working coil 132. Additionally, FIG. 13 shows a waveform of input current, i.e., resonance current, input to the working coil 132.

When the operation mode of the induction heating apparatus 10 is the full bridge mode as illustrated in FIG. 13, the input voltage Vab and the resonance current have the same frequency. Additionally, the input voltage Vab and the resonance current have the same frequency as the switching signal S1, S2, S3, S4. Accordingly, a voltage gain of the working coil 132 may be maintained at a maximum value (e.g., 1), and power may be supplied to the container reliably.

When the operation mode of the induction heating apparatus 10 is determined as the full bridge mode, the controller 2 may determine the power control mode of the induction heating apparatus 10 as any one of the asymmetric pulse width modulation mode and a phase shift mode.

In the asymmetric pulse width modulation mode, the controller 2 may adjust a duty ratio of the switching signal S1, S2, S3, S4 while maintaining the frequency of the switching signal S1, S2, S3, S4 to adjust the output power value of the working coil 132.

In the phase shift mode, the controller 2 may adjust the output power value of the working coil 132 by adjusting a phase difference between mutually corresponding switching signals while maintaining the frequency of the switching signal S1, S2, S3, S4.

In one embodiment, when the operation mode of the induction heating apparatus 10 is the full bridge mode, the controller 2 may compare a required power value of the working coil 132 with a predetermined reference power value and determine the power control mode of the induction heating apparatus 10 as any one of the asymmetric pulse width modulation mode and the phase shift mode. For example, when the required power value of the working coil 132 is less than the reference power value, the controller 2 may determine the power control mode of the induction heating apparatus 10 as the asymmetric pulse width modulation mode, and when the required power value of the working coil 132 is not less than the reference power value, the controller 2 may determine the power control mode of the induction heating apparatus 10 as the phase shift mode.

Figure 14:
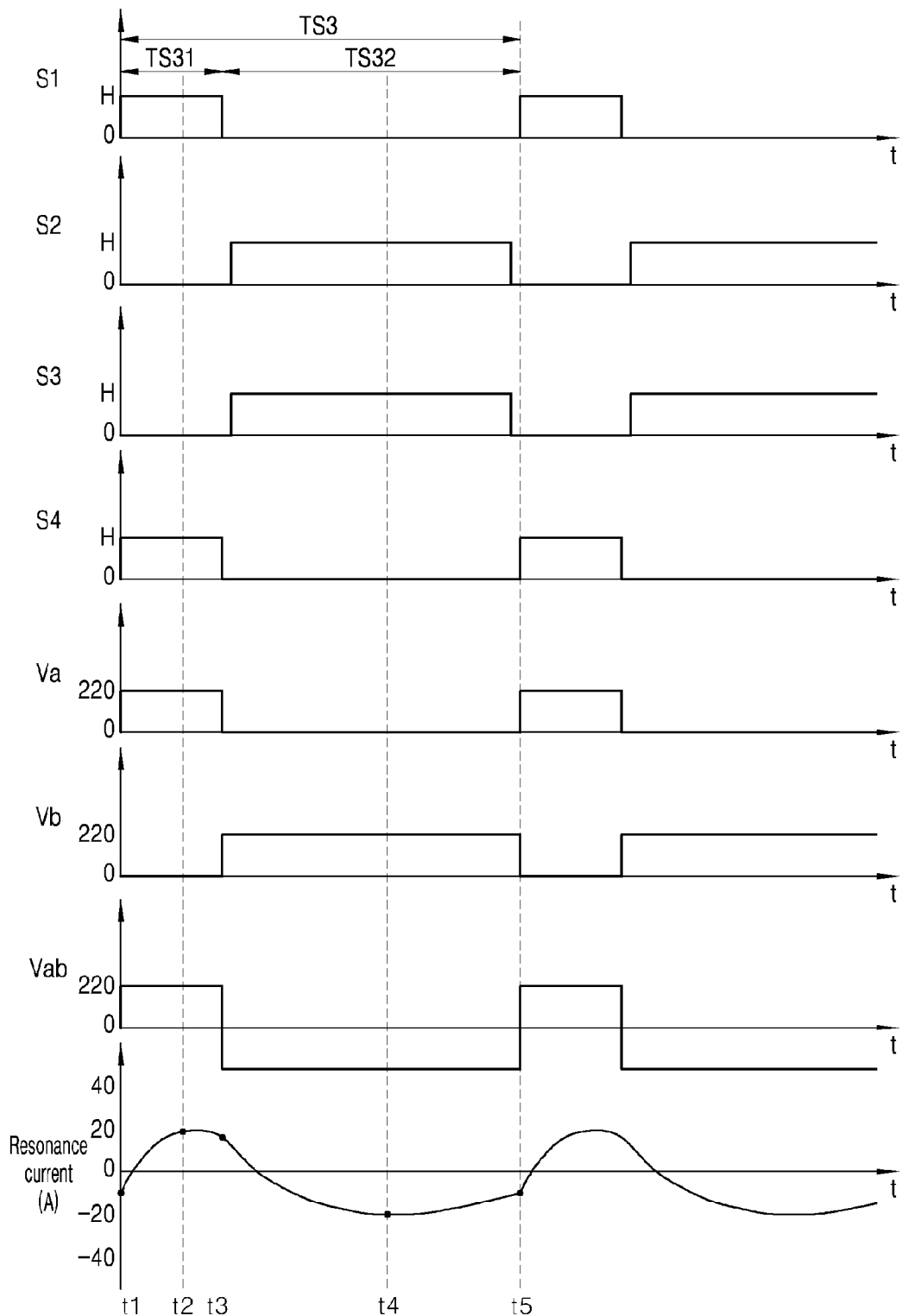
FIG. 14 shows waveforms of switching signals, input voltage and resonance current when an operation mode of an induction heating apparatus is a full bridge mode and a power control mode of the induction heating apparatus is an asymmetric pulse width modulation mode, respectively, in one embodiment.

FIG. 14 shows waveforms of switching signals, input voltage and resonance current when an operation mode of an induction heating apparatus is a full bridge mode and a power control mode of the induction heating apparatus is an asymmetric pulse width modulation mode, respectively, in one embodiment.

When the power control mode of the induction heating apparatus 10 is determined as the asymmetric pulse width modulation mode, the controller 2 may adjust the duty ratio of the switching signal S1, S2, S3, S4. As illustrated in FIG. 14, magnitude Vab of input voltage and magnitude of resonance current may respectively change depending on turn-on time TS31 of the first switching signal S1 and the fourth switching signal S4 (or turn-off time of the second switching signal S2 and the third switching signal S3) and depending on turn-on time TS32 of the second switching signal S2 and the third switching signal S3 (or turn-off time of the first switching signal S1 and the four switching signal S4). Since the output power value of the working coil 132 varies depending on the magnitude Vab of the input voltage and the magnitude of the resonance current, the controller 2 may adjust the output power value of the working coil 132 by adjusting the turn-on time TS31 of the first switching signal S1 and the fourth switching signal S4, i.e., the duty ratio of the first switching signal S1 and the fourth switching signal S4.

For example, the controller 2 may increase the output power value of the working coil 132 by increasing the turn-on time TS31 of the first switching signal S1 and the fourth switching signal S4, in other words, by increasing the duty ratio of the first switching signal S1 and the fourth switching signal S4. On the contrary, the controller 2 may decrease the output power value of the working coil 132 by decreasing the turn-on time TS31 of the first switching signal S1 and the fourth switching signal S4, in other words, by decreasing the duty ratio of the first switching signal S1 and the fourth switching signal S4.

The duty ratio of the first switching signal S1 and the fourth switching signal S4 in the embodiment of FIG. 14 is less than in the embodiment of FIG. 13. Thus, the output power value of the working coil 132 in the embodiment of FIG. 14 is less than in the embodiment of FIG. 13.

Figure 15:
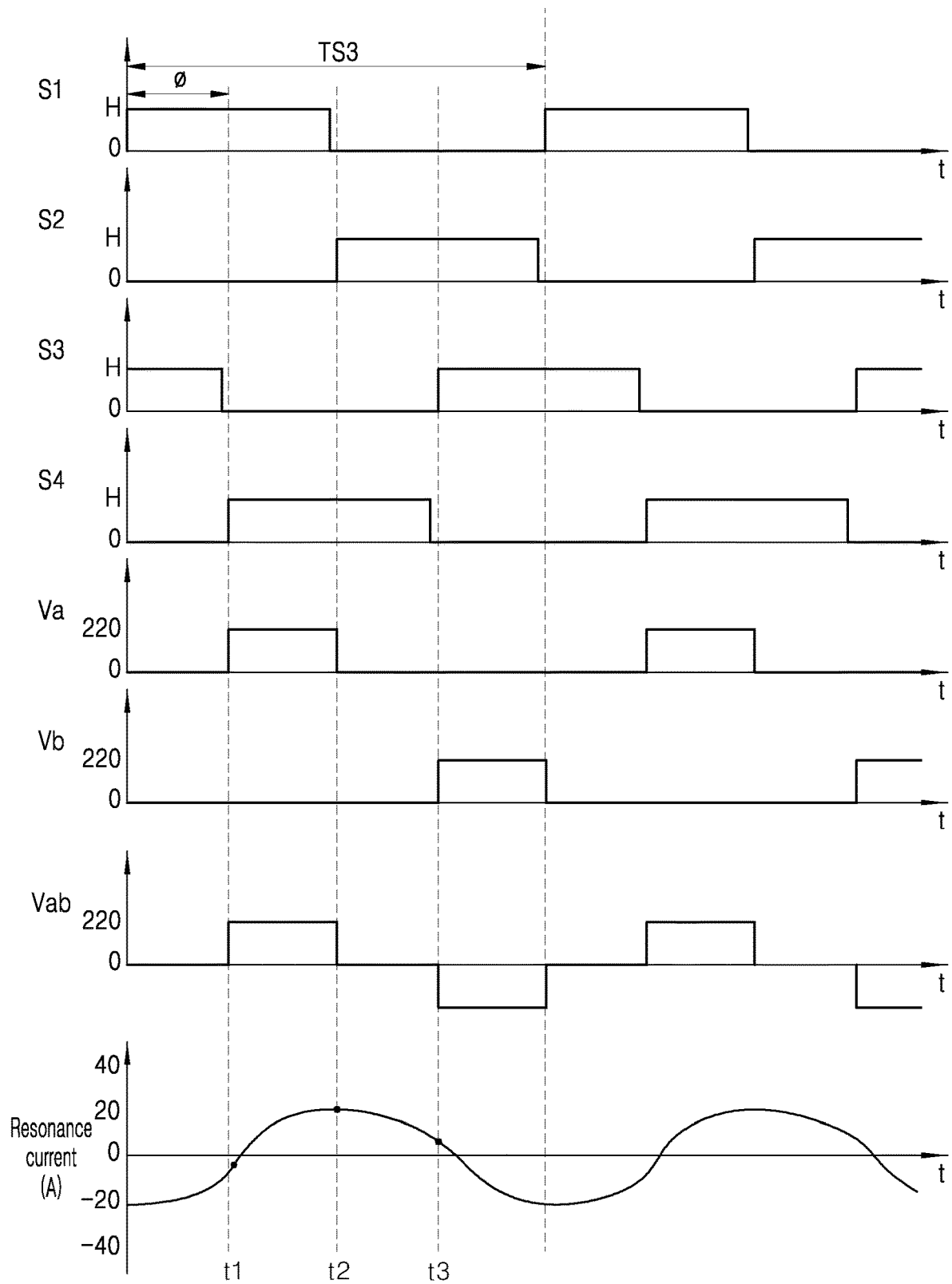
FIG. 15 shows waveforms of switching signals, input voltage and resonance current when an operation mode of an induction heating apparatus is a full bridge mode and a power control mode of the induction heating apparatus is a phase shift mode, respectively, in one embodiment.

FIG. 15 shows waveforms of switching signals, input voltage and resonance current when an operation mode of an induction heating apparatus is a full bridge mode and a power control mode of the induction heating apparatus is a phase shift mode, respectively, in one embodiment.

When the power control mode of the induction heating apparatus 10 is determined as the phase shift mode, the controller 2 may adjust a phase difference between mutually corresponding switching signals. As illustrated in FIG. 15, magnitude Vab of input voltage and magnitude of resonance current may respectively change depending on a phase difference between the first switching signal S1 and the third switching signal S3 corresponding to each other (or a phase difference between the second switching signal S2 and the fourth switching signal S4). Since the output power value of the working coil 132 varies depending on the magnitude Vab of the input voltage and the magnitude of the resonance current, the controller 2 may adjust the phase difference between the first switching signal S1 and the third switching signal S3 corresponding to each other to adjust the output power value of the working coil 132.

For example, the controller 2 may increase the output power value of the working coil 132 by decreasing the phase difference between the first switching signal S1 and the third switching signal S3 corresponding to each other, in other words, by increasing the duty ratio of the first switching signal S1 and the fourth switching signal S4. On the contrary, the controller 2 may decrease the output power value of the working coil 132 by increasing the phase difference between the first switching signal S1 and the third switching signal S3 corresponding to each other.

The phase difference (90°) between the first switching signal S1 and the third switching signal S3 corresponding to each other in the embodiment of FIG. 15 is greater than the phase difference (0°) between the first switching signal S1 and the third switching signal S3 corresponding to each other in the embodiment of FIG. 13. Thus, the output power value of the working coil 132 in the embodiment of FIG. 15 is less than in the embodiment of FIG. 13.

Figure 16:
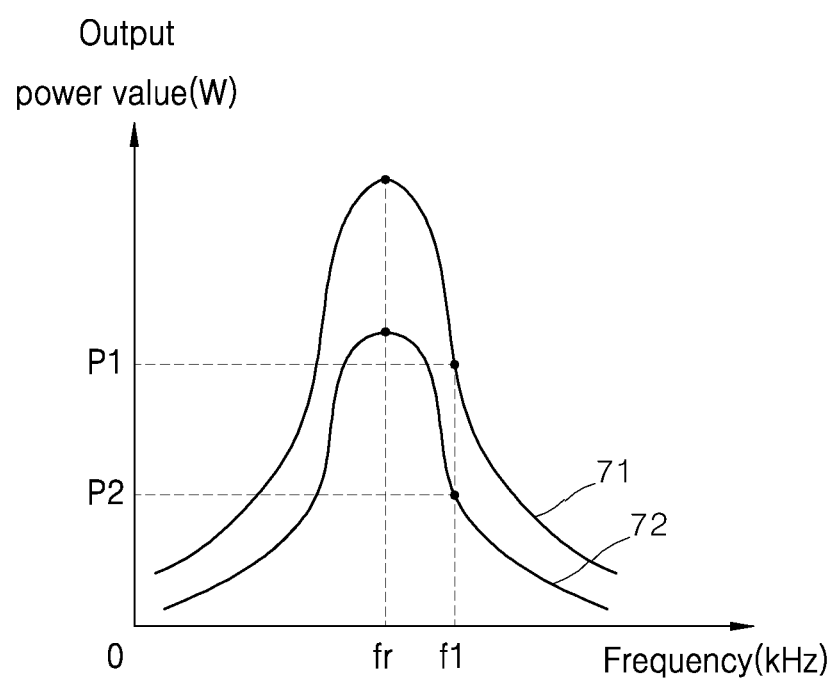
FIG. 16 is a graph showing a curve of a resonance characteristic of a working coil when an operation mode of an induction heating apparatus is a full bridge mode in one embodiment.

FIG. 16 is a graph showing a curve of a resonance characteristic of a working coil when an operation mode of an induction heating apparatus is a full bridge mode in one embodiment.

FIG. 16 shows a curve 71 of a resonance characteristic of the working coil 132 at a 50% duty ratio of the first switching signal S1 in the full bridge mode, and a curve 72 of a resonance characteristic of the working coil 132 at a 30% duty ratio of the first switching signal S1 in the full bridge mode, respectively. In FIG. 16, fr is a resonance frequency of the working coil 132.

When the driving frequency of the working coil 132 is f1 in the full bridge mode and the duty ratio of the first switching signal S1 is set to 50% as illustrated in FIG. 16, the output power value of the working coil 132 may be P1. However, when the controller 2 reduces the duty ratio of the first switching signal S1 from 50% to 30% while maintaining the driving frequency of the working coil 132 at f1, the output power value of the working coil 132 may be reduced to P2. Accordingly, the controller 2 may adjust the output power value of the working coil 132 only by adjusting the duty ratio of the first switching signal S1 according to the asymmetric pulse width modulation method while maintaining the driving frequency of the working coil 132 at the same value in the full bridge mode.

The graph in FIG. 16 may also be a curve 71 of a resonance characteristic at a phase difference of 0° between the first switching signal S1 and the third switching signal S3 and a curve 72 of a resonance characteristic at a phase difference of 90° between the first switching signal S1 and the third switching signal S3.

When the driving frequency of the working coil 132 is f1 in the full bridge mode and the phase difference between the first switching signal S1 and the third switching signal S3 is set to 0° as illustrated in FIG. 16, the output power value of the working coil 132 may be P1. However, when the controller 2 increases the phase difference between the first switching signal S1 and the third switching signal S3 to 90° while maintaining the driving frequency of the working coil 132 at f1, the output power value of the working coil 132 may be reduced to P2. Accordingly, the controller 2 may adjust the output power value of the working coil 132 only by adjusting the phase difference between the first switching signal S1 and the third switching signal S3 according to the phase shift method while maintaining the driving frequency of the working coil 132 at the same value in the full bridge mode.

Referring to FIG. 11 showing the curves of the resonance characteristics in the half bridge mode and FIG. 16 showing the curves of the resonance characteristics in the full bridge mode, when the driving frequency of the working coil 132 is the same under the same conditions, the output power value of the working coil 132 in the half bridge mode may be less than the output power value of the working coil 132 in the full bridge mode.

Figure 17:
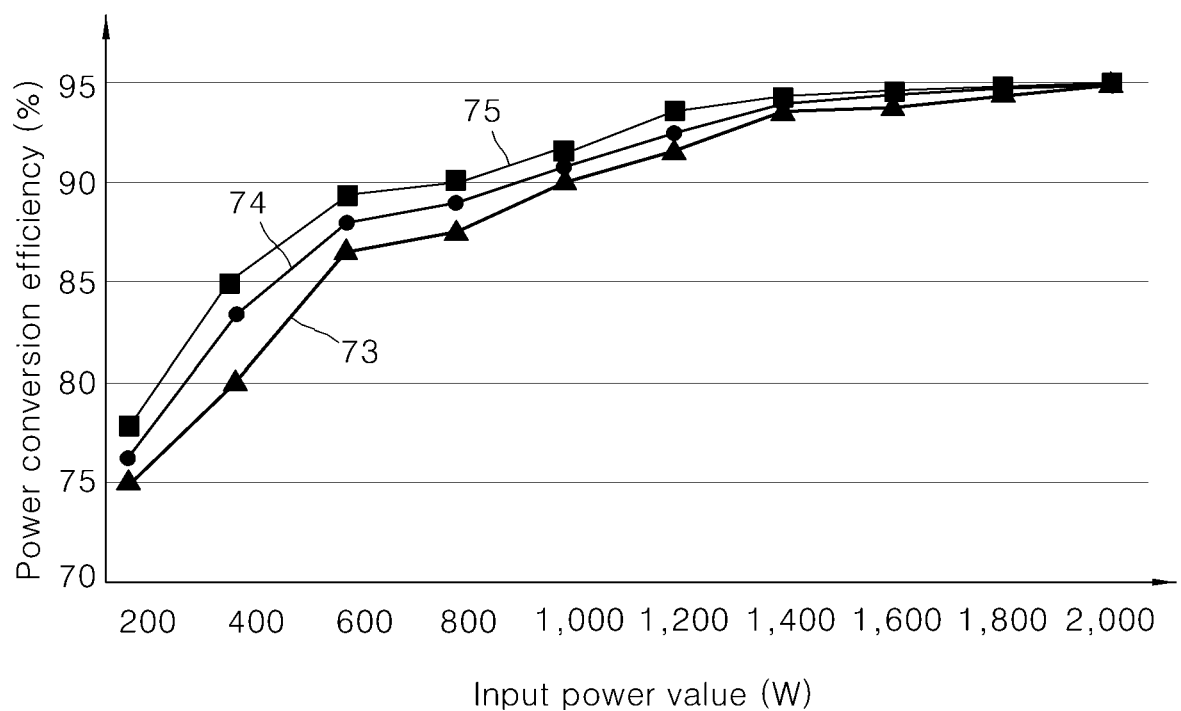
FIG. 17 shows power conversion efficiency of an induction heating apparatus when a power control mode of the induction heating apparatus is set to a pulse frequency modulation mode, an asymmetric pulse width modulation mode and a phase shift mode in a state in which an operation mode of the induction heating apparatus is a full bridge mode, respectively, in one embodiment.

FIG. 17 shows power conversion efficiency of an induction heating apparatus when a power control mode of the induction heating apparatus is set to a pulse frequency modulation mode, an asymmetric pulse width modulation mode and a phase shift mode in a state in which an operation mode of the induction heating apparatus is a full bridge mode, respectively, in one embodiment.

FIG. 17 shows a graph 73 of power conversion efficiency with respect to each input power value when the power control mode of the induction heating apparatus 10 is set to the pulse frequency modulation mode, that is, when the controller 2 adjusts the driving frequency of the working coil 132 to adjust the output power value of the working coil 132 in the full bridge operation mode of the induction heating apparatus 10.

FIG. 17 also shows a graph 74 of power conversion efficiency with respect to each input power value when the power control mode of the induction heating apparatus 10 is set to the asymmetric pulse width modulation mode, that is, when the controller 2 adjusts the duty ratio of the switching signal without adjusting the driving frequency of the working coil 132 to adjust the output power value of the working coil 132 in the full bridge operation mode of the induction heating apparatus 10.

FIG. 17 also shows a graph 75 of power conversion efficiency with respect to each input power value when the power control mode of the induction heating apparatus 10 is set to the phase shift mode, that is, when the controller 2 adjusts the phase difference between mutually corresponding switching signals adjusting the driving frequency of the working coil 132 to adjust the output power value of the working coil 132 in the full bridge operation mode of the induction heating apparatus 10.

As illustrated in FIG. 17, across an entire range of input power values, the power conversion efficiency in the power control mode of the induction heating apparatus 10 set to the asymmetric pulse width modulation mode or the phase shift mode is greater than in the power control mode of the induction heating apparatus 10 set to the pulse frequency modulation mode. Accordingly, the power conversion efficiency of the working coil 132 of the induction heating apparatus 10 according to the disclosure may improve further than that of the working coil of the induction heating apparatus of the related art, by adjusting the output power value of the working coil 132 using the asymmetric pulse width modulation method or the phase shift method in the state in which the operation mode of the induction heating apparatus is set to the full bridge mode.

When the operation mode and the power control mode of the induction heating apparatus 10 are determined through the above processes, the controller 2 may set the driving frequency of the working coil 132 to the second reference frequency and drive the working coil 132.

In one embodiment, the second reference frequency may be set to the minimum frequency fmin of the working coil 132. Accordingly, the output power value of the working coil 132 may be a maximum power value Pmax corresponding to the minimum frequency fmin in each operation mode. However, the second reference frequency may also be set to a different value instead of the minimum frequency depending on embodiments.

After the working coil 132 is driven in the state in which the driving frequency of the working coil 132 is set to the second reference frequency, the controller 2 may adjust the output power value of the working coil 132 to the required power value of the working coil 132 based on the determined power control mode (808).

In an example, when the operation mode and the power control mode of the working coil 132 are respectively the frequency doubler mode and the asymmetric pulse width modulation mode, the controller 2 may increase the duty ratio of the first switching signal S1 to increase the output power value of the working coil 132 or may decrease the duty ratio of the first switching signal S1 to decrease the output power value of the working coil 132 such that the output power value of the working coil 132 is adjusted to the required power value of the working coil 132.

In another example, when the operation mode and the power control mode of the working coil 132 are respectively the full bridge mode and the phase shift mode, the controller 2 may decrease the phase difference between the first switching signal S1 and the fourth switching signal S4 to increase the output power value of the working coil 132 or may increase the phase difference between the first switching signal S1 and the fourth switching signal S4 to decrease the output power value of the working coil 132 such that the output power value of the working coil 132 is adjusted to the required power value of the working coil 132.

Figure 18:
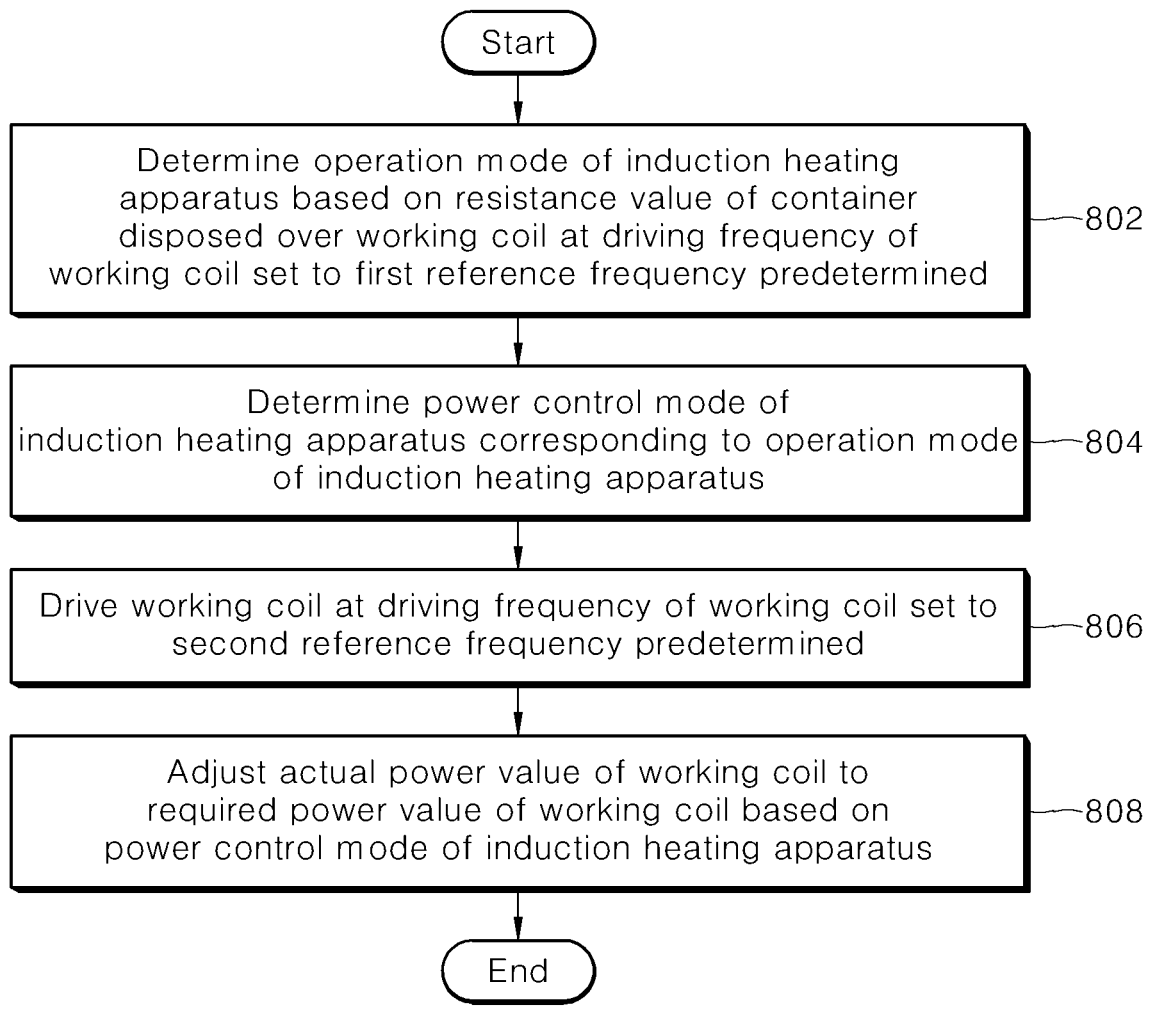
FIG. 18 is a flow chart showing a method for controlling an induction heating apparatus according to one embodiment.

FIG. 18 is a flow chart showing a method for controlling an induction heating apparatus according to one embodiment.

A controller 2 of the induction heating apparatus 10 according to one embodiment may set a driving frequency of a working coil 132 to a first reference frequency predetermined to drive the working coil 132. The controller 2 may determine an operation mode of the induction heating apparatus 10 based on a resistance value of a container placed over the working coil 132 in the state in which the driving frequency of the working coil 132 is set to the first reference frequency (802).

Figure 19:
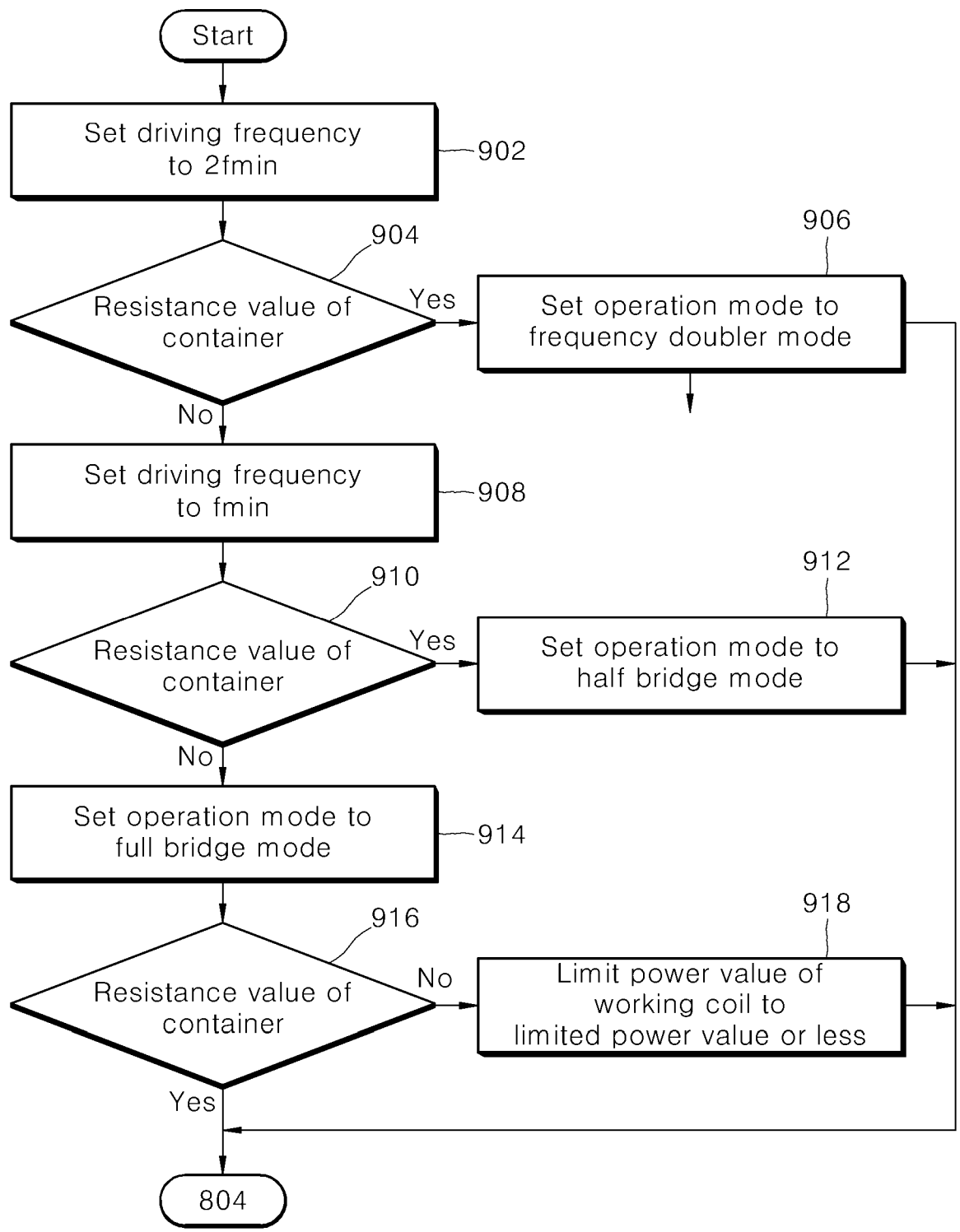
FIG. 19 is a flow chart showing a method for determining an operation mode of an induction heating apparatus by a controller in one embodiment.

FIG. 19 is a flow chart showing a method for determining an operation mode of an induction heating apparatus by a controller in one embodiment.

The controller 2 may set a driving frequency of a working coil 132 to twice a minimum frequency fmin, i.e., 2×fmin, (902) and may calculate a resistance value of a container by driving the working coil 132.

The controller 2 may compare the resistance value of the container with a first reference resistance value K1 predetermined (904).

When the resistance value of the container is less than the first reference resistance value K1 as a result of comparison in step 904, the controller 2 may set the operation mode of the induction hating apparatus 10 to a frequency doubler mode (906), and may perform step 804.

When the resistance value of the container is not less than the first reference resistance value K1 as a result of comparison in step 904, the controller 2 may set the driving frequency of the working coil 132 to the minimum frequency fmin (908), and may calculate a resistance value of the container by driving the working coil 132.

The controller 2 may compare the resistance value of the container with a second reference resistance value K2 predetermined (910).

When the resistance value of the container is less than the second reference resistance value K2 as a result of comparison in step 910, the controller 2 may set the operation mode of the induction hating apparatus 10 to a half bridge mode (912), and may perform step 804.

When the resistance value of the container is not less than the second reference resistance value K2 as a result of comparison in step 910, the controller 2 may set the operation mode of the induction hating apparatus 10 to a full bridge mode (914).

In the state in which the operation mode of the induction hating apparatus 10 is set to the full bridge mode, the controller 2 may compare the resistance value of the container with a third reference resistance value K3 predetermined (916).

When the resistance value of the container is not less than the third reference resistance value K3 as a result of comparison in step 916, the controller 2 may limit a power value of the working coil 132 to a predetermined limited power value or less (918), and may perform step 804.

When the resistance value of the container is less than the third reference resistance value K3 as a result of comparison in step 916, the controller 2 may perform step 804 without limiting a power value of the working coil 132.

Referring back to FIG. 18, when the operation mode of the induction heating apparatus 10 is determined in step 802, the controller 2 may determine a power control mode of the induction heating apparatus 10 corresponding to the operation mode of the induction heating apparatus 10 (804).

In one embodiment, determining the power control mode of the induction heating apparatus 10 (804) may include determining the power control mode of the induction heating apparatus 10 as an asymmetric pulse width modulation mode when the operation mode of the induction heating apparatus 10 is any one of the frequency doubler mode and the half bridge mode.

In one embodiment, determining the power control mode of the induction heating apparatus 10 (804) may include determining the power control mode of the induction heating apparatus 10 as any one of the asymmetric pulse width modulation mode and a phase shift mode when the operation mode of the induction heating apparatus 10 is the full bridge mode.

In one embodiment, when the power control mode of the induction heating apparatus 10 is the asymmetric pulse width modulation mode, duty ratios of complementary switching signals input to an inverter circuit 204 may be set asymmetrically.

In one embodiment, when the power control mode of the induction heating apparatus 10 is the phase shift mode, mutually corresponding switching signals input to the inverter circuit 204 may be set to have a phase difference.

When the power control mode of the induction heating apparatus 10 is determined, the controller 2 may set the driving frequency of the working coil 132 to a second reference frequency and may drive the working coil 132 (806).

In one embodiment, the second reference frequency may be set to the minimum frequency fmin of the working coil 132. Accordingly, an output power value of the working coil 132 may be a maximum power value Pmax corresponding to the minimum frequency fmin in each operation mode. However, the second reference frequency may also be set to a different value instead of the minimum frequency depending on embodiments.

When the working coil 132 is driven, the controller 2 may adjust the output power value of the working coil 132 to a required power value of the working coil 132 based on the power control mode of the induction heating apparatus 10 (808).

In one embodiment, adjusting the output power value of the working coil 132 to the required power value of the working coil 132 (808) may include adjusting the output power value of the working coil 132 by adjusting the duty ratio of the switching signal input to the inverter circuit 204 when the power control mode of the induction heating apparatus 10 is the asymmetric pulse width modulation mode.

In one embodiment, adjusting the output power value of the working coil 132 to the required power value of the working coil 132 (808) may include adjusting the output power value of the working coil 132 by adjusting the phase difference between the mutually corresponding switching signals input to the inverter circuit 204 when the power control mode of the induction heating apparatus 10 is the phase shift mode.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical idea of the disclosure. Further, the effects and predictable effects based on the configurations in the disclosure are to be included within the range of the disclosure though not explicitly described in the description of the embodiments.

An object of the present invention is to provide an induction heating apparatus and a method for controlling the same that may heat various types of containers having different features.

A further object of the present invention is to provide an induction heating apparatus and a method for controlling the same that may ensure excellent power conversion efficiency regardless of magnitude of a required power value of a working coil.

An object of the present invention is to provide an induction heating apparatus and a method for controlling the same that may reduce the possibility that a switching element generates heat and is burned out even though a required power value of a working coil is set to a low value.

Aspects according to the present disclosure are not limited to the above ones, and other aspects and advantages that are not mentioned above can be clearly understood from the following description and can be more clearly understood from the embodiments set forth herein. Additionally, the aspects and advantages of the present disclosure can be realized via means and combinations thereof that are described in the appended claims.

The object is solved by the features of the independent claims. Preferred embodiments are given in the dependent claims.

An induction heating apparatus according to one embodiment may confirm a feature of a container and determine an operation mode based on the feature of the container before performing an operation of heating the container. In one embodiment, the operation mode of the induction heating apparatus may be determined as any one of a frequency doubler mode, a half bridge mode, and a full bridge mode.

In the frequency doubler mode, a frequency of resonance current input to a working coil may be set to twice of a frequency of a switching signal input to an inverter circuit. Accordingly, the resonance frequency band and the driving frequency band of the working coil are increased. Although the resonance frequency band and the driving frequency band of the working coil are increased, magnitude of input voltage input to the working coil may not be reduced, so that magnitude of a power value that can be output from the working coil may be maintained at a high level.

In the half bridge mode or the full bridge mode, a frequency of resonance current input to the working coil may be set the same value as a frequency of a switching signal input to the inverter circuit. The resonance frequency band and the driving frequency band of the working coil in the half bridge mode or the full bridge mode may be lower than in the frequency doubler mode.

That is, according to one embodiment, the resonance frequency band and the driving frequency band of the working coil may be set differently based on a feature of a container. Thus, the induction heating apparatus according to one embodiment may heat various types of container having different features.

In one embodiment, a power control mode of the induction heating apparatus may be determined based on an operation mode of the induction heating apparatus. In one embodiment, the power control mode of the induction heating apparatus may be determined as any one of an asymmetric pulse width modulation (APWM) mode and a phase shift mode.

In the asymmetric pulse width modulation mode, the induction heating apparatus may adjust a pulse width of a switching signal (or a duty ratio of a switching signal) input to the inverter circuit to adjust an output power value of the working coil.

In the phase shift mode, the induction heating apparatus may adjust a phase difference between switching signals input to the inverter circuit to adjust the output power value of the working coil.

When the output power value of the working coil is adjusted based on the asymmetric pulse width modulation mode or the phase shift mode, the driving frequency of the working coil does not change. As described above, when the driving frequency of the working coil becomes higher, power conversion efficiency may deteriorate due to an increase in power loss of the switching element, and it is highly likely that the switching element generates heat and is burned out. However, according to one embodiment, an actual output value of the working coil may be adjusted with no need to change the driving frequency of the working coil. Thus, the above problems may be solved.

A method for controlling an induction heating apparatus according to one embodiment may include determining an operation mode of an induction heating apparatus based on a resistance value of a container disposed over a working coil in a state in which a driving frequency of the working coil is set to a first reference frequency predetermined, determining a power control mode of the induction heating apparatus corresponding to the operation mode of the induction heating apparatus, driving the working coil in a state in which the driving frequency of the working coil is set to a second reference frequency predetermined, and adjusting an output power value of the working coil to a required power value of the working coil based on the power control mode of the induction heating apparatus, wherein the power control mode of the induction heating apparatus is determined as any one of an asymmetric pulse width modulation mode and a phase shift mode.

In one embodiment, determining an operation mode of an induction heating apparatus based on a resistance value of a container disposed over a working coil may include determining the operation mode of the induction heating apparatus as a frequency doubler mode when the resistance value of the container is less than a first reference resistance value predetermined in a state in which the first reference frequency is set to twice a minimum frequency of the working coil.

In one embodiment, determining an operation mode of an induction heating apparatus based on a resistance value of a container disposed over a working coil may include determining the operation mode of the induction heating apparatus as a half bridge mode when the resistance value of the container is less than a second reference resistance value predetermined in a state in which the first reference frequency is set to the minimum frequency of the working coil.

In one embodiment, determining an operation mode of an induction heating apparatus based on a resistance value of a container disposed over a working coil may include determining the operation mode of the induction heating apparatus as a full bridge mode when the resistance value of the container is not less than the second reference resistance value predetermined in the state in which the first reference frequency is set to the minimum frequency of the working coil.

The method for controlling an induction heating apparatus according to one embodiment may further include limiting a power value of the working coil to a predetermined limited power value or less when the resistance value of the container is not less than a third reference resistance value predetermined in the state in which the first reference frequency is set to the minimum frequency of the working coil.

In one embodiment, determining a power control mode of the induction heating apparatus corresponding to the operation mode of the induction heating apparatus may include determining the power control mode of the induction heating apparatus as the asymmetric pulse width modulation mode when the operation mode of the induction heating apparatus is any one of a frequency doubler mode and a half bridge mode.

In one embodiment, determining a power control mode of the induction heating apparatus corresponding to the operation mode of the induction heating apparatus may include determining the power control mode of the induction heating apparatus as any one of the asymmetric pulse width modulation mode and the phase shift mode when the operation mode of the induction heating apparatus is a full bridge mode.

In one embodiment, the second reference frequency may be set to the minimum frequency of the working coil.

In one embodiment, when the power control mode of the induction heating apparatus is the asymmetric pulse width modulation mode, duty ratios of complementary switching signals input to an inverter circuit may be set asymmetrically.

In one embodiment, adjusting an output power value of the working coil to a required power value of the working coil based on the power control mode of the induction heating apparatus may include adjusting the output power value of the working coil by adjusting a duty ratio of a switching signal input to an inverter circuit when the power control mode of the induction heating apparatus is the asymmetric pulse width modulation mode.

In one embodiment, when the power control mode of the induction heating apparatus is the phase shift mode, mutually corresponding switching signals input to the inverter circuit may be set to have a phase difference.

In one embodiment, adjusting an output power value of the working coil to a required power value of the working coil based on the power control mode of the induction heating apparatus may include adjusting the output power value of the working coil by adjusting a phase difference between mutually corresponding switching signals input to an inverter circuit when the power control mode of the induction heating apparatus is the phase shift mode.

An induction heating apparatus according to one embodiment may include a working coil, an inverter circuit comprising a plurality of switching elements and configured to supply the working coil with current, a controller configured to set a driving frequency of the working coil to a first reference frequency predetermined, to determine an operation mode of the induction heating apparatus based on a resistance value of a container disposed over the working coil, to determine a power control mode of the induction heating apparatus corresponding to the operation mode of the induction heating apparatus, to drive the working coil in a state in which the driving frequency of the working coil is set to a second reference frequency predetermined, and to adjust an output power value of the working coil to a required power value of the working coil based on the power control mode of the induction heating apparatus, wherein the power control mode of the induction heating apparatus is determined as any one of an asymmetric pulse width modulation mode and a phase shift mode.

In one embodiment, when the resistance value of the container is less than a first reference resistance value predetermined in a state in which the first reference frequency is set to twice a minimum frequency of the working coil, the controller may determine the operation mode of the induction heating apparatus as a frequency doubler mode.

In one embodiment, when the resistance value of the container is less than a second reference resistance value predetermined in a state in which the first reference frequency is set to the minimum frequency of the working coil, the controller may determine the operation mode of the induction heating apparatus as a half bridge mode.

In one embodiment, when the resistance value of the container is not less than the second reference resistance value predetermined in the state in which the first reference frequency is set to the minimum frequency of the working coil, the controller may determine the operation mode of the induction heating apparatus as a full bridge mode.

In one embodiment, when the resistance value of the container is not less than a third reference resistance value predetermined in the state in which the first reference frequency is set to the minimum frequency of the working coil, the controller may limit a power value of the working coil to a predetermined limited power value or less.

In one embodiment, when the operation mode of the induction heating apparatus is any one of a frequency doubler mode and a half bridge mode, the controller may determine the power control mode of the induction heating apparatus as the asymmetric pulse width modulation mode.

In one embodiment, when the operation mode of the induction heating apparatus is a full bridge mode, the controller may determine the power control mode of the induction heating apparatus as any one of the asymmetric pulse width modulation mode and the phase shift mode.

In one embodiment, the second reference frequency may be set to a minimum frequency of the working coil.

In one embodiment, when the power control mode of the induction heating apparatus is the asymmetric pulse width modulation mode, duty ratios of complementary switching signals input to an inverter circuit may be set asymmetrically.

In one embodiment, when the power control mode of the induction heating apparatus is the asymmetric pulse width modulation mode, the controller may adjust the output power value of the working coil by adjusting a duty ratio of a switching signal input to an inverter circuit.

In one embodiment, when the power control mode of the induction heating apparatus is the phase shift mode, mutually corresponding switching signals input to the inverter circuit may be set to have a phase difference.

In one embodiment, when the power control mode of the induction heating apparatus is the phase shift mode, the controller may adjust the output power value of the working coil by adjusting a phase difference between mutually corresponding switching signals input to the inverter circuit.

An induction heating apparatus according to the present disclosure may heat various types of containers having different features.

The induction heating apparatus according to the present disclosure may ensure excellent power conversion efficiency regardless of magnitude of a required power value of a working coil.

The induction heating apparatus according to the present disclosure may reduce the possibility that a switching element generates heat and is burned out even though a required power value of a working coil is set to a low value.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an induction heating apparatus, comprising:
    determining an operation mode of the induction heating apparatus based on a resistance value of an object on a working coil when a driving frequency of the working coil is set to a first reference frequency value;
    determining a power control mode of the induction heating apparatus based on the determined operation mode, wherein the determined power control mode is one of an asymmetric pulse width modulation mode and a phase shift mode;
    driving the working coil in a state in which the driving frequency of the working coil is set to a second reference frequency value; and
    adjusting an output power value of the working coil according to the determined power control,
    wherein the adjusting of the output power value according to the determined power control mode comprises:
        when the power control mode is determined to be the asymmetric pulse width modulation mode, adjusting the output power value of the working coil by adjusting a duty ratio of a switching signal of an inverter circuit while maintaining the driving frequency of the working coil set to the second reference frequency value, and when the power control mode is determined to be the phase shift mode, adjusting the output power value of the working coil by adjusting a phase difference between mutually corresponding switching signals of an inverter circuit while maintaining the driving frequency of the working coil set to the second reference frequency value.

2. The method of claim 1, wherein the determining of the operation mode comprises:

determining the operation mode to be a frequency doubler mode when the resistance value of the object is less than a first reference resistance value and when the first reference frequency value is set to twice a minimum frequency value of the working coil;

determining the operation mode to be a half bridge mode when the resistance value of the object is less than a second reference resistance value and when the first reference frequency value is set to the minimum frequency value of the working coil; and determining the operation mode to be a full bridge mode when the resistance value of the object is not less than the second reference resistance value and when the first reference frequency value is set to the minimum frequency value of the working coil.

3. The method of claim 2, wherein the determining of the operation mode comprises:

limiting a power value of the working coil to a predetermined limited power value or less when the resistance value of the object is not less than a third reference resistance value and when the first reference frequency value is set to the minimum frequency value of the working coil.

4. The method of claim 1, wherein the determining of the power control mode comprises:

determining the power control mode to be the asymmetric pulse width modulation mode when the determined operation mode is a frequency doubler mode or a half bridge mode; and determining the power control mode to be one of the asymmetric pulse width modulation mode and the phase shift mode when the determined operation mode is a full bridge mode.

5. The method of claim 1, wherein the second reference frequency value is set to a minimum frequency value of the working coil.

6. The method of claim 1, comprising asymmetrically setting duty ratios of complementary switching signals of the inverter circuit when the determined power control mode is the asymmetric pulse width modulation mode.

7. The method of claim 1, comprising setting mutually corresponding switching signals of the inverter circuit so as to have a phase difference when the determined power control mode is the phase shift mode.

* * * * *

UNITED STATES PATENT AND TRADEMARK OFFICE
CERTIFICATE OF CORRECTION

| | | |
|---|---|---|
| PATENT NO. | : 12,028,954 B2 | Page 1 of 1 |
| APPLICATION NO. | : 17/313354 | |
| DATED | : July 2, 2024 | |
| INVENTOR(S) | : Sihoon Jeong et al. | |

It is certified that error appears in the above-identified patent and that said Letters Patent is hereby corrected as shown below:

On the Title Page

(73) Assignee should read:
LG ELECTRONICS INC., Seoul (KR)
ULSAN NATIONAL INSTITUTE OF SCIENCE AND TECHNOLOGY, Ulsan (KR)

Signed and Sealed this
Twelfth Day of November, 2024

Katherine Kelly Vidal
*Director of the United States Patent and Trademark Office*